United States Patent
Otsuki et al.

(10) Patent No.: US 9,448,551 B2
(45) Date of Patent: Sep. 20, 2016

(54) TRANSLATION/ROTATION ERROR COMPENSATION AMOUNT CREATING DEVICE

(71) Applicant: FANUC CORPORATION, Minamitsuru-gun, Yamanashi (JP)

(72) Inventors: Toshiaki Otsuki, Yamanashi (JP); Osamu Hanaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 382 days.

(21) Appl. No.: 14/043,183

(22) Filed: Oct. 1, 2013

(65) Prior Publication Data

US 2014/0094970 A1 Apr. 3, 2014

(30) Foreign Application Priority Data

Oct. 2, 2012 (JP) ................ 2012-220675

(51) Int. Cl.
*G05B 15/00* (2006.01)
*G05B 19/404* (2006.01)

(52) U.S. Cl.
CPC ... *G05B 19/404* (2013.01); *G05B 2219/49189* (2013.01); *G05B 2219/49198* (2013.01)

(58) Field of Classification Search
CPC .......... G05B 19/404; G05B 2219/49189; G05B 2219/49198
USPC ........................................ 700/275
See application file for complete search history.

(56) References Cited

U.S. PATENT DOCUMENTS

| | | | |
|---|---|---|---|
| 2011/0015877 A1 | 1/2011 | Okita et al. | |
| 2011/0234142 A1* | 9/2011 | Otsuki | G05B 19/404 318/572 |
| 2012/0001583 A1* | 1/2012 | Otsuki | G05B 19/404 318/632 |

FOREIGN PATENT DOCUMENTS

| | | |
|---|---|---|
| DE | 10201001776 A1 | 2/2011 |
| JP | 2004-272887 A | 9/2004 |
| JP | 20099274 A | 1/2009 |
| JP | 2009-151756 A | 7/2009 |
| JP | 2011-209897 A | 10/2011 |

(Continued)

OTHER PUBLICATIONS

Office Action mailed Mar. 3, 2015, corresponding to Japanese patent application No. 2012-220675.
Office Action mailed Jun. 3, 2014, corresponds to Japanese patent application No. 2012-220675.
Journal of Technical Disclosure No. 2009-505137.

(Continued)

*Primary Examiner* — Mohammad Ali
*Assistant Examiner* — Yuhui R Pan
(74) *Attorney, Agent, or Firm* — Hauptman Ham, LLP

(57) ABSTRACT

A translation/rotation error compensation amount creating device creates, for a multi-axis machining apparatus having two rotation axes, a translation error compensation amount and a rotation error compensation amount both depending on the rotation axes. The translation/rotation error compensation amount creating device calculates the translation error compensation amount and the rotation error compensation amount based on an assembly error (set value) including at least an assembly error in a table surface or an assembly error in a spindle turning centerline in a multi-axis machining apparatus as well as the positions of the two rotation axes, and inputs the calculated error compensation amounts to a numerical controller controlling the multi-axis machining apparatus.

2 Claims, 12 Drawing Sheets

(56) References Cited

FOREIGN PATENT DOCUMENTS

| | | |
|---|---|---|
| JP | 2012-14335 A | 1/2012 |
| JP | 2012-104153 A | 5/2012 |

OTHER PUBLICATIONS

European Search Report dated Sep. 10, 2015 for corresponding German Application 10 2013 110 689.7, 16 pages.

* cited by examiner

TRANSLATION/ROTATION ERROR COMPENSATION AMOUNT CREATING DEVICE

RELATED APPLICATIONS

The present application is based on Japanese Application Number 2012-220675, filed Oct. 1, 2012, the disclosure of which is hereby incorporated by reference herein in its entirety.

BACKGROUND OF THE INVENTION

1. Field of the Invention

The present invention relates to a device that creates a translation error compensation amount and a rotation error compensation amount both depending on a rotation axis, based on a preset assembly error and a rotation axis position in order to compensate an assembly error in a multi-axis machining apparatus having at least two rotation axes.

Now, the translation error compensation amount and rotation error compensation amount depending on the rotation axis will be described.

In "JIS B6190-7 FIG. 1 b) Error motion of rotation axis" of Japanese Industrial Standard, errors depending on a C shaft are represented as:

"EXC: radial motion in an X direction",
"EYC: radial motion in a Y direction",
"EZC: axial motion",
"EAC: tilting motion around an X shaft",
"EBC: tilting motion around an Y shaft", and
"ECC: angular positioning error".

According to the present invention, of the errors depending on a C shaft, "EXC: radial motion in the X direction", "EYC: radial motion in the Y direction", and "EZC: axial motion" are referred to as translation errors (specifically, translation errors depending on the C shaft). "EAC: tilting motion around the X shaft", "EBC: tilting motion around the Y shaft", and "ECC: angular positioning error" are referred to as rotation errors (specifically, rotation errors depending on the C axis).

For another rotation axis, for example, an A axis, the following are present: "EXA: axial motion", "EYA: radial motion in the Y direction", "EZA: radial motion in a Z direction axial motion", "EAA: angular positioning error", "EBA: tilting motion around the Y shaft", and "ECA: tilting motion around a Z shaft".

Thus, the translation errors and the rotation errors varying depending on the positions of the rotation axes are hereinafter referred to as translation errors and rotation errors depending on the rotation axes, and compensation amounts by which those errors are compensated are hereinafter referred to as translation error compensation amounts and rotation error compensation amounts depending on the rotation axes.

2. Description of the Related Art

Japanese Patent Application Laid-open No. 2004-272887 (JP 2004-272887 A) discloses a technique for compensating an assembly error in a rotation axis in a multi-axis machining apparatus having rotation axes. The technique uses many matrix operations using triangular functions. Thus, the technique can be partly carried out in practice, but a numerical controller that needs to perform high-speed control takes a long time for arithmetic operations, and the technique is thus difficult to carry out in practice. Moreover, the technique disadvantageously fails to take into account an assembly error in a table surface, that is, an error between a table surface centerline and a table rotation axis rotation centerline, more specifically, an error in which the table surface fails to be perpendicular to the table rotation axis (C axis described below) rotation centerline and in which the table surface centerline deviates from the table rotation axis (C axis) rotation centerline.

On the other hand, Japanese Patent Application Laid-open No. 2009-151756 (JP 2009-151756 A) discloses a technique for compensating an error based on a translation error compensation amount and a rotation error compensation amount both depending on rotation axes. The technique performs matrix operations but does not take such a long time as needed for the technique described in JP 2004-272887 A. Thus, the technique disclosed in JP 2009-151756 A allows a numerical controller to perform compensation in practice. However, to determine the compensation amount, the technique divides a two-dimensional coordinate system for two rotation axes into pieces like a grid, sets a translation error compensation amount and a rotation error compensation amount at each of the resultant grid points, and calculates a compensation amount for the position of the rotation axis based on compensation amounts for grid points enclosing the position of the rotation axis. That is, the technique is not a method for obtaining the compensation amount from the assembly error. Thus, when an attempt is made to compensate the assembly error by the technique disclosed in JP 2009-151756 A, the assembly error needs to be converted into a translation error compensation amount and a rotation error compensation amount both depending on the rotation axes and to set the translation error compensation amount and the rotation error compensation amount. However, JP 2009-151756 A fails to disclose such a conversion technique.

Furthermore, Journal of Technical Disclosure No. 2009-505137 discloses a technique for creating the compensation amount disclosed in JP 2009-151756 A from the assembly error in a multi-axis machining apparatus (table rotating multi-axis machining apparatus) having two rotation axes for rotation of a table which is disclosed in JP 2004-272887 A. The technique fails to take an assembly error in the table surface into account. Journal of Technical Disclosure No. 2009-505137 describes a technique for creating a compensation amount from an assembly error in a rotation axis in a table rotating 5-axis machining apparatus and further states that the technique can be applied to a head rotating 5-axis machining apparatus (see FIG. 10) in which a head rotates based on two rotation axes and a mixed 5-axis machining apparatus (see FIG. 14) in which both a head and a table rotate.

However, the inventors have found that it is insufficient to apply the technique disclosed in Journal of Technical Disclosure No. 2009-505137 directly to the tool head rotating 5-axis machining apparatus or the mixed 5-axis machining apparatus. The reason is as follows.

In terms of an error in a member installed on a rotor, the assembly error in the tool head rotating multi-axis machining apparatus corresponding to the assembly error in the table surface in the table rotating multi-axis machining apparatus is an assembly error in a spindle turning centerline, that is, an error in which the spindle turning centerline fails to be orthogonal to the rotational centerline of a tool head tilting axis (an A axis described below). JP 2004-272887 A takes the assembly error in the spindle turning centerline into account while Journal of Technical Disclosure No. 2009-505137 does not take into account the assembly error in the table surface in the table rotating multi-axis machining apparatus as described above. Thus, even when the technique disclosed in Journal of Technical Disclosure No. 2009-505137 is applied to the tool head rotating multi-axis machining apparatus disclosed in JP 2004-272887 A, the assembly error in the spindle turning centerline fails to be compensated. This also applies to the mixed multi-axis machining apparatus.

SUMMARY OF THE INVENTION

Thus, an object of the present invention is to provide a translation/rotation error compensation amount creating device for a numerical controller controlling a multi-axis machining apparatus having at least two rotation axes by:

converting an assembly error including an assembly error in a table surface in a table rotating multi-axis machining apparatus having a rotary table into a translation error compensation amount and a rotation error compensation amount both depending on the rotation axes;

converting an assembly error including an assembly error in a spindle turning centerline in a tool head rotating multi-axis machining apparatus into a translation error compensation amount and a rotation error compensation amount both depending on the rotation axes; or converting an assembly error including an assembly error in a table surface and an assembly error in a spindle turning centerline in a mixed multi-axis machining apparatus into a translation error compensation amount and a rotation error compensation amount both depending on the rotation axes, wherein the translation/rotation error compensation amount creating device enables the numerical controller to compensate the assembly error in the table surface or the assembly error in the spindle turning centerline in practice in a shorter time.

A translation/rotation error compensation amount creating device according to the present invention creates, for a multi-axis machining apparatus having at least two rotation axes, a translation error compensation amount and a rotation error compensation amount both depending on the rotation axes. The translation/rotation error compensation amount creating device includes an assembly error setting section that presets an assembly error including at least an assembly error in a table surface or an assembly error in a spindle turning centerline in the multi-axis machining apparatus, a translation/rotation error compensation amount calculating section that calculates the translation error compensation amount and the rotation error compensation amount based on the assembly error set by the assembly error setting section and positions of the two rotation axes, and a translation/rotation error compensation amount input section that inputs the calculated translation error compensation amount and rotation error compensation amount to a numerical controller controlling the multi-axis machining apparatus.

The positions of the two rotation axes may be the positions of the two rotation axes obtained from the numerical controller at every interpolation period.

The two rotation axes are two rotation axes for table rotation, the multi-axis machining apparatus is a table rotating multi-axis machining apparatus, and the assembly error is the assembly error in the table surface and an assembly error in the two rotation axes for table rotation.

The two rotation axes are two rotation axes for tool head rotation, the multi-axis machining apparatus is a tool head rotating multi-axis machining apparatus, and the assembly error is the assembly error in the spindle turning centerline and an assembly error in the two rotation axes for tool head rotation.

The two rotation axes are one rotation axis for table rotation and one rotation axis for tool head rotation, the multi-axis machining apparatus is a mixed multi-axis machining apparatus with one rotation axis for table rotation and one rotation axis for tool head rotation, and the assembly error is the assembly error in the table surface, an assembly error in the one rotation axis for table rotation, an assembly error in the one rotation axis for tool head rotation, and the assembly error in the spindle turning centerline.

The numerical controller according to the present invention controls a multi-axis machining apparatus having at least two rotation axes, and has a numerical control section that analyzes a machining program to carry out interpolation and a translation/rotation error compensation amount creating device that creates a translation error compensation amount and a rotation error compensation amount both depending on the rotation axes. Furthermore, the translation/rotation error compensation amount creating device has an assembly error setting section that presets an assembly error including at least an assembly error in a table surface or an assembly error in a spindle turning centerline in the multi-axis machining apparatus, a translation/rotation error compensation amount calculating section that calculates the translation error compensation amount and the rotation error compensation amount based on the assembly error set by the assembly error setting section and positions of the two rotation axes, and a translation/rotation error compensation amount input section that inputs the calculated translation error compensation amount and rotation error compensation amount to the numerical controller.

The positions of the two rotation axes may be the positions of the two rotation axes obtained from the numerical controller at every interpolation period.

The present invention can provide the translation/rotation error compensation amount creating device for the numerical controller controlling the multi-axis machining apparatus having at least two rotation axes by:

converting the assembly error including the assembly error in the table surface in the table rotating multi-axis machining apparatus having the rotary table into the translation error compensation amount and rotation error compensation amount depending on the rotation axes;

converting the assembly error including the assembly error in the spindle turning centerline in the tool head rotating multi-axis machining apparatus into the translation error compensation amount and rotation error compensation amount depending on the rotation axes; or converting the assembly error including the assembly error in the table surface and the assembly error in the spindle turning centerline in the mixed multi-axis machining apparatus into the translation error compensation amount and rotation error compensation amount depending on the rotation axes, wherein the translation/rotation error compensation amount creating device enables the numerical controller to compensate the assembly error in the table surface or the assembly error in the spindle turning centerline in practice in a shorter time.

A calculation for the conversion is much more complicated than a calculation described in Journal of Technical Disclosure No. 2009-505137 in which an assembly error not including an assembly error in a table surface in a table rotating multi-axis machining apparatus is converted into a translation error compensation amount and a rotation error compensation amount both depending on the rotation axes, as described below in an embodiment.

In accordance with notation in JP 2009-151756 A, the translation error compensation amount depending on the rotation axes is denoted by (ΔXR, ΔYR, ΔZR), and the rotation error compensation amount depending on the rotation axes is denoted by (ΔIR, ΔJR, ΔKR).

The term "compensation" as used herein refers to correct a linear-axis machine coordinate position so that a relative positional relation between a table and a tool center point in an original instruction is the same as the relative relation between the actual table (with an assembly error) and the compensated tool center point position.

The specification is intended for the conversion of an assembly error in the table surface, that is, an assembly error including a translation error and a rotation error in the table surface (table centerline described below) with respect to a table rotation axis rotation centerline, into a translation error compensation amount and a rotation error compensation amount both depending on the rotation axes. However, an installation error (a translation error and a rotation error in a workpiece centerline described below) during workpiece installation may be considered to be an assembly error (translation error and rotation error) in the table surface. Thus, the present invention is applicable to an error during workpiece installation.

BRIEF DESCRIPTION OF THE DRAWINGS

The above-described and other objects and features of the present invention will be apparent from the description below of embodiments given with reference to the attached drawings, in which.

DETAILED DESCRIPTION OF THE PREFERRED EMBODIMENTS

First Embodiment

<1> Target Machine and Errors

Figure 1:
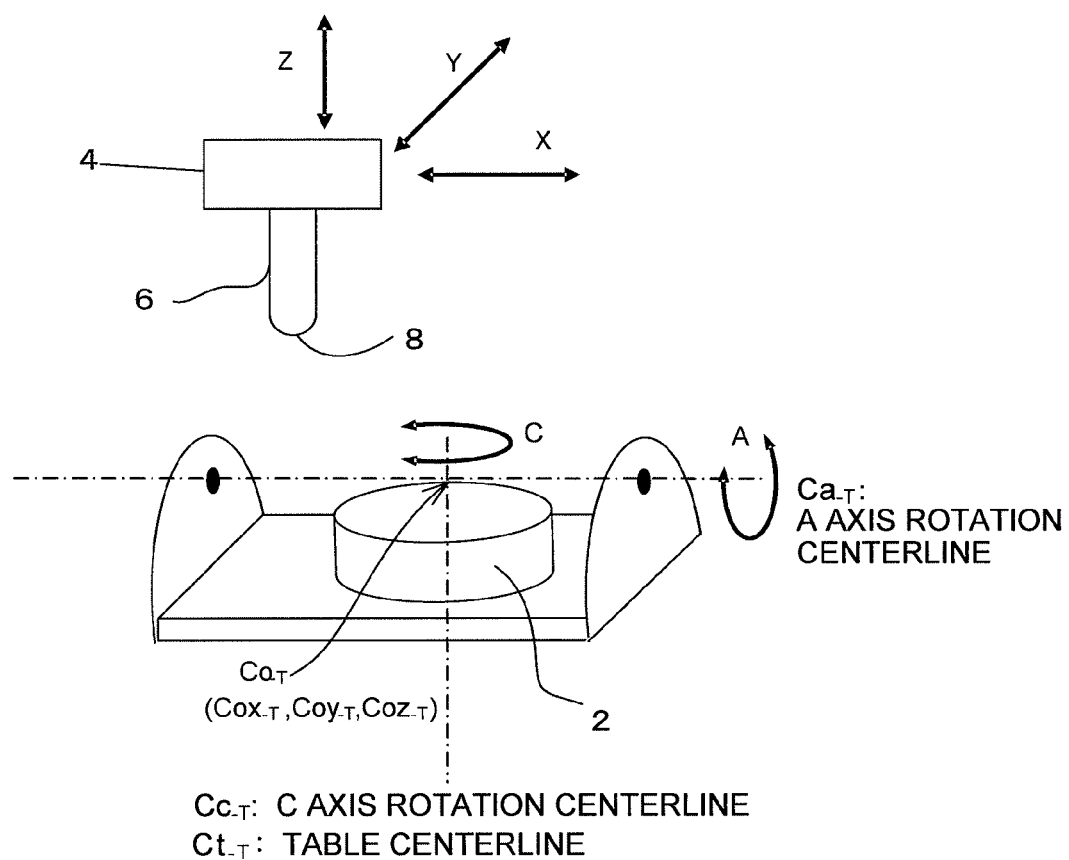
FIG. 1 is a diagram illustrating a table rotating multi-axis machining apparatus (5-axis machining apparatus) without any assembly error.

FIG. 1 shows a table rotating multi-axis machining apparatus (5-axis machining apparatus) without any assembly error. In this case, a table 2 rotates with respect an A axis and a C axis, and a tool head 4 equipped with a tool 6 with a tool center point 8 moves with respect to an X axis, a Y axis, and a Z axis. Another axial configuration may be used if the machining apparatus includes a table 2 that rotates with respect to two rotation axes.

When A=0, the rotary table is horizontally placed as shown in FIG. 1. An original A axis rotation centerline $Ca_{-T}$ is orthogonal to an original C axis rotation centerline $Cc_{-T}$, and the original C axis rotation centerline $Cc_{-T}$ coincides with an original table centerline $Ct_{-T}$. In this case, "C" means "Correct", and "A" in $A_{t-T}$ described below (displaced table centerline) and the like means "Actual". Furthermore, "$_{-T}$" means that the data forms an error in the table. A position instruction for the A axis and the C axis, which are rotation axes, is denoted by (a, c).

Figure 2:
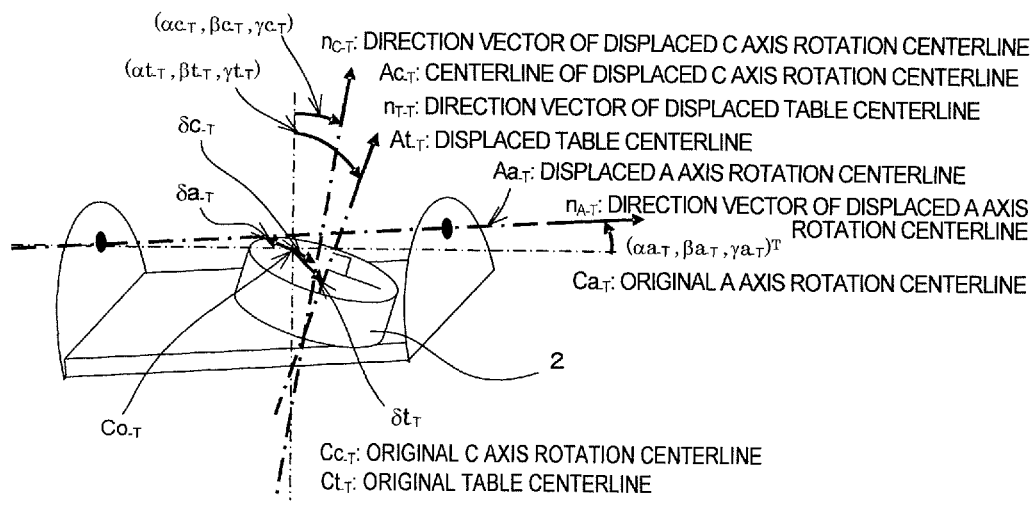
FIG. 2 is a diagram illustrating that an assembly error including an assembly error in a table surface is represented as an error in a rotation axis rotation centerline (A axis rotation centerline and C axis rotation centerline) and an error (translation error and rotation error) in the table surface with respect to a table rotation axis rotation centerline (C axis rotation centerline)

As shown in FIG. 2, an assembly error including an assembly error in the table surface is represented as an error in a rotation axis rotation centerline (A axis rotation centerline and C axis rotation centerline) and an assembly error (translation error and rotation error) in the table surface with respect to the table centerline (C axis rotation centerline). Errors are exaggerated in FIG. 2, though the actual errors are small.

Errors are represented as follows. The errors are pre-measured and set by an assembly error setting section.

1) An Error in a Displaced Table Centerline $At_{-T}$ with Respect to the Original Table Centerline $Ct_{-T}$ $\delta t_{-T} (\delta tx_{-T}, \delta ty_{-T}, \delta tz_{-T})^T$: an X component, a Y component, and a Z component of a deviation distance from $Ct_{-T}$ observed when A=0 and C=0 and corresponding to $Co_{-T}$ that is an intersecting point between the original A axis rotation centerline and the original C axis rotation centerline, to $At_{-T}$. This is a translation error in the assembly error in the table surface. "$T$" represents transposition but will not particularly be described when the transposition is obvious.

$(\alpha t_{-T}, \beta t_{-T}, \gamma t_{-T})$: this indicates that, when A=0 and C=0, $At_{-T}$ is tilted from $Ct_{-T}$ with a rotation error $\alpha t_{-T}$ around an X axis, a rotation error $\beta t_{-T}$ around a Y axis, and a rotation error $\gamma t_{-T}$ around a Z axis. This is a rotation error in the assembly error in the table surface and is expressed in radian. Data indicative of an angle is hereinafter expressed in radian unless otherwise specified.

$n_{T-T}$: a direction vector of $At_{-T}$. Thus, $n_{T-T}$ is normal to the actual (displaced) table surface.

2) An Error in the Displaced C Axis Rotation Centerline $Ac_{-T}$ with Respect to the Original C Axis Rotation Centerline $Cc_{-T}$ $\delta c_{-T} (\delta cx_{-T}, \delta cy_{-T}, \delta cz_{-T})$: the X component, Y component, and Z component of a deviation distance from $Cc_{-T}$ observed when A=0 and corresponding to $Co_{-T}$ that is the intersecting point between the original A axis rotation centerline and the original C axis rotation centerline, to $Ac_{-T}$. This is a translation error in an assembly error in the C axis.

In this case, $Ac_{-T}$ may vary like a top depending on the position of the C axis. Then, $\delta c_{-T}$ is $\delta c_{-T}(c)$ ($\delta cx_{-T}(c)$, $\delta cy_{-T}(c)$, $\delta cz_{-T}(c)$) varying depending on c.

Figure 3:
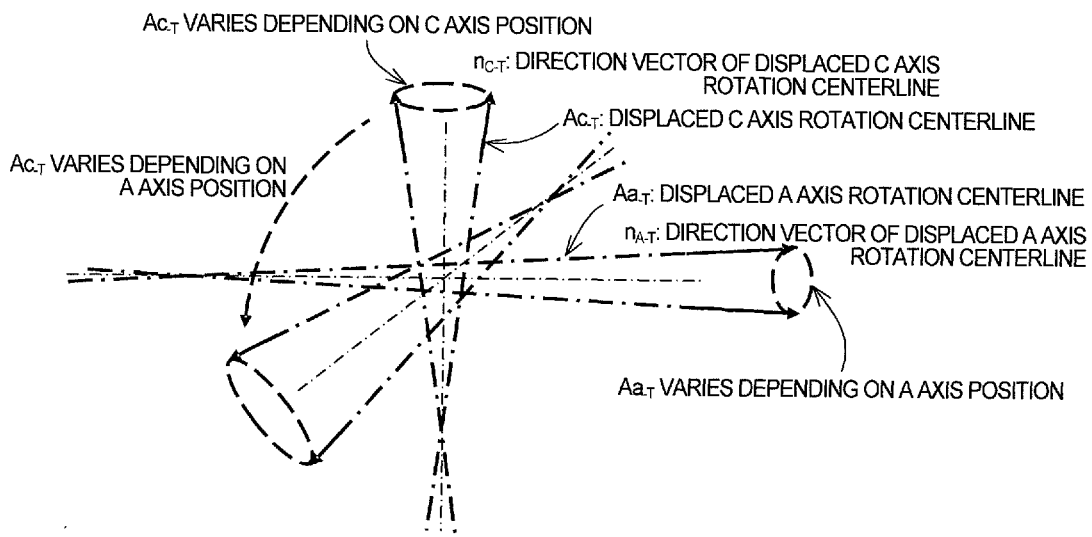
FIG. 3 is a diagram showing how the displaced rotation axis rotation centerline varies, focusing only on the rotation axis rotation centerline.

Moreover, $Ac_{-T}$ may be affected by the position of the other axis. If $Ac_{-T}$ is affected by the position of the A axis, $\delta c_{-T}$ is $\delta c_{-T}(a, c)$ ($\delta cx_{-T}(a, c)$, $\delta cy_{-T}(a, c)$, $\delta cz_{-T}(a, c)$) varying depending on (a, c). FIG. 3 illustrates how Ac-T and Aa-T, described next, vary, focusing only on the rotation axis rotation centerline.

$(\alpha c_{-T}, \beta c_{-T}, \gamma c_{-T})$: this indicates that, when A=0, $Ac_{-T}$ is tilted from $Cc_{-T}$ with a rotation error $\alpha c_{-T}$ around the X axis, a rotation error $\beta c_{-T}$ around the Y axis, and a rotation error $\gamma c_{-T}$ around the Z axis. This is a rotation error in the assembly error in the C axis. As is the case with $\delta c_{-T}$, if $Ac_{-T}$ varies depending on the position of the C axis, $(\alpha c_{-T}, \beta c_{-T}, \gamma c_{-T})$ is $(\alpha c_{-T}(c), \beta c_{-T}(c), \gamma c_{-T}(c))$ varying depending on c. Moreover, if $Ac_{-T}$ is affected by the position of the other axis (A axis), $(\alpha c_{-T}, \beta c_{-T}, \gamma c_{-T})$ is $(\alpha c_{-T}(a, c), \beta c_{-T}(a, c), \gamma c_{-T}(a, c))$ varying depending on (a, c) (see FIG. 3).

$n_{C-T}$: a direction vector of $Ac_{-T}$.

3) An Error in the Displaced A Axis Rotation Centerline $Aa_{-T}$ with Respect to the Original a Axis Rotation Centerline $Ca_{-T}$ $\delta a_{-T} (\delta ax_{-T}, \delta ay_{-T}, \delta az_{-T})$: the X component, Y component, and Z component of a deviation distance from $Ca_{-T}$ corresponding to $Co_{-T}$ that is the intersecting point between the original A axis rotation centerline and the original C axis rotation centerline, to $Aa_{-T}$. This is a translation error in an assembly error in the A axis. As is the case with $\delta c_{-T}$, if $Aa_{-T}$ varies depending on the position of the A axis, $\delta a_{-T}$ is $\delta a_{-T}(a)$ ($\delta ax_{-T}(a)$, $\delta ay_{-T}(a)$, $\delta az_{-T}(a)$) varying depending on a (see FIG. 3).

$(\alpha a_{-T}, \beta a_{-T}, \gamma a_{-T})$: this indicates that $Aa_{-T}$ is tilted from $Ca_{-T}$ with a rotation error $\alpha a_{-T}$ around the X axis, a rotation error $\beta a_{-T}$ around the Y axis, and a rotation error $\gamma a_{-T}$ around the Z axis. This is a rotation error in the assembly error in the A axis. As is the case with $\delta a_{-T}$, if $Aa_{-T}$ varies depending on the position of the A axis, $(\alpha a_{-T}, \beta a_{-T}, \gamma a_{-T})$ is $(\alpha a_{-T}(a), \beta a_{-T}(a), \gamma a_{-T}(a))$ varying depending on a (see FIG. 3).

$n_{A-T}$: a direction vector of $Aa_{-T}$.

<2> Translation Error Compensation Amount and Rotation Error Compensation Amount Depending on the Rotation Axes A workpiece is placed on the table. Here, an assembly error in the table (translation error $\delta t_{-T}$ ($\delta tx_{-T}$, $\delta ty_{-T}$, $\delta tz_{-T}$) and a rotation error ($\alpha t_{-T}$, $\beta t_{-T}$, $\gamma t_{-T}$) are focused on. Then, when A=0 and C=0, a translation error compensation amount ($\Delta XR$, $\Delta YR$, $\Delta ZR$) and a rotation error compensation amount ($\Delta IR$, $\Delta JR$, $\Delta KR$) both depending on the rotation axes (A axis and C axis) are $\delta t_{-T}$ ($\delta tx_{-T}$, $\delta ty_{-T}$, $\delta tz_{-T}$) and ($\alpha t_{-T}$, $\beta t_{-T}$, $\gamma t_{-T}$), respectively.

Errors in the table are compensated so as to be traced, and are thus equal to compensation amounts.

When A=a and C=c, the translation error $\delta t_{-T}$ and the rotation error ($\alpha t_{-T}$, $\beta t_{-T}$, $\gamma t_{-T}$) are varied as follows by rotation of the A axis and the C axis. When the table rotates so that A=a and C=c, the table itself rotates around the C axis by −c and around the A axis by −a. Thus, a translation/rotation error compensation amount calculating section 42 (see FIG. 6) carries out a calculation for a case where the table rotates around the actual C axis (displaced C axis rotation centerline, $Ac_{-T}$) by −c and around the actual A axis (displaced A axis rotation centerline, $Aa_{-T}$) by −a. In the calculation, square terms for an error and an error compensation amount are neglected. Furthermore, when a rotation error is denoted by e, |e|<<1, and the following approximations are carried out: sin(e)=e and cos(e)=1. This is also applicable to embodiments to be described later.

<2-1> Translation Error Compensation Amount

A translation error $\delta t_{-T}$ ($\delta tx_{-T}$, $\delta ty_{-T}$, $\delta tz_{-T}$) in the table is rotated around the displaced C axis rotation centerline $Ac_{-T}$ by −c and further around the displaced A axis rotation centerline $Aa_{-T}$ by −a.

A matrix that rotates, by −c, around a vector $n_{C-T}$ indicative of the direction of $Ac_{-T}$ observed when A=0 is denoted by $Mc_{-T}$. A matrix that rotates, by −a, around a vector $n_{A-T}$ indicative of the direction of $Aa_{-T}$ is denoted by $Ma_{-T}$.

The expression "A translation error $\delta t_{-T}$ ($\delta tx_{-T}$, $\delta ty_{-T}$, $\delta tz_{-T}$) in the table is rotated around $Ac_{-T}$ by −c and further around $Aa_{-T}$ by −a" means that $\delta t_{-T}$ (=$tx_{-T}$, $\delta ty_{-T}$, $\delta tz_{-T}$) is rotated around $n_{C-T}$ in $\delta c_{-T}$ by −c and further around $n_{A-T}$ in $\delta a_{-T}$ by −a. Thus, the translation error compensation amount ($\Delta XR$, $\Delta YR$, $\Delta ZR$) corresponding to the position of the A axis (a) and the position of the C axis (c) (that is, depending on the rotation axes) is as expressed by:

$$\begin{bmatrix} \Delta XR \\ \Delta YR \\ \Delta ZR \end{bmatrix} = Ma_{-T} * \{Mc_{-T} * (\delta t_{-T} - \delta c_{-T}) + \delta c_{-T} - \delta a_{-T}\} + \delta a_{-T} \quad (1)$$

$$= \begin{bmatrix} (\delta tx_{-T} - \delta cx_{-T})\cos(c) + (\delta ty_{-T} - \delta cy_{-T})\sin(c) + \delta cx_{-T} \\ \{-(\delta ty_{-T} - \delta cy_{-T})\sin(c) + (\delta ty_{-T} - \delta cy_{-T})\cos(c) + \\ \delta cy_{-T} - \delta ay_{-T}\}\cos(a) + (\delta tz_{-T} - \delta az_{-T})\sin(a) + \delta ay_{-T} \\ -\{-(\delta ty_{-T} - \delta cy_{-T})\sin(c) + (\delta ty_{-T} - \delta cy_{-T})\cos(c) + \\ \delta cy_{-T} - \delta ay_{-T}\}\sin(a) + (\delta tz_{-T} - \delta az_{-T})\cos(a) + \delta az_{-T} \end{bmatrix}$$

<2-2> Rotation Error Compensation Amount

A rotation error ($\alpha t_{-T}$, $\beta t_{-T}$, $\gamma t_{-T}$) in the table rotates around the C axis rotation centerline $Ac_{-T}$ by −c and further around the A axis rotation centerline $Aa_{-T}$ by −a. A vector in the correct table centerline direction observed when A=a and C=c is denoted by $nz_{-T}$. A rotation matrix $M_I$ based on the rotation error compensation amount ($\Delta IR$, $\Delta JR$, $\Delta KR$) corresponding to the position of the vector when A=a and C=c (that is, the rotation error compensation amount ($\Delta IR$, $\Delta JR$, $\Delta KR$) depending on the rotation axes), is expressed by:

$$M_I = \begin{bmatrix} 1 & -\Delta KR & \Delta JR \\ \Delta KR & 1 & -\Delta JR \\ -\Delta JR & \Delta IR & 1 \end{bmatrix}. \quad (2)$$

A direction obtained from compensation of the vector $nz_{-T}$ using the rotation error compensation amount ($\Delta IR$, $\Delta JR$, $\Delta KR$) corresponds to a direction resulting from rotation of the vector $n_{T-T}$ around $Ac_{-T}$ by $-c$ and further around $Aa_{-T}$ by $-a$, and thus, Formula (3) holds true.

$$\begin{bmatrix} \beta t_{-T}\cos(c) - \alpha t_{-T}\sin(c) + \beta c_{-T}(1-\cos(c)) + \alpha c_{-T}\sin(c) - \\ \beta a_{-T}(1-\cos(a)) - \gamma a_{-T}\sin(a) \\ \{-\beta t_{-T}\sin(c) - \alpha t_{-T}\cos(c) - \alpha c_{-T}(1-\cos(c)) + \\ \beta c_{-T}\sin(c)\}\cos(a) + \sin(a) \\ -\{-\beta t_{-T}\sin(c) - \alpha t_{-T}\cos(c) - \alpha c_{-T}(1-\cos(c)) + \\ \beta c_{-T}\sin(c)\}\sin(a) + \cos(a) \end{bmatrix} = \quad (3)$$

$$\begin{bmatrix} -\Delta KR\sin(a) + \Delta JR\cos(a) \\ \sin(a) - \Delta IR\cos(a) \\ \Delta IR\sin(a) + \cos(a) \end{bmatrix}$$

Formula (4) is obtained from the second and third elements of Formula (3).

$$\Delta IR = -\{-\beta_{-T}\sin(c) - \alpha t_{-T}\cos(c) - \alpha c_{-T}(1-\cos(c)) + \beta c_{-T}\sin(c)\} \quad (4)$$

$\Delta JR$ and $\Delta KR$ are determined from the first element of Formula (3) but are not uniquely determined. Thus, on the assumption that a denotes a tilting axis and is movable within the range of about $-85$ degrees$<a<85$ degrees ($\cos(a)$ does not assume a value close to 0), $0.0871 < \cos(a) \le 1$. Thus, $\Delta JR$ and $\Delta KR$ are determined as shown in Formula (5). The rotation error compensation amount ($\Delta IR$, $\Delta JR$, $\Delta KR$) depending on the rotation axes is determined as described above. Of course, another solution meets Formula (3).

$$\Delta KR = \gamma a_{-T} \quad (5)$$

$$\Delta JR = \frac{\beta t_{-T}\cos(c) - \alpha t_{-T}\sin(c) + \beta c_{-T}(1-\cos(c)) + \alpha c_{-T}\sin(c) - \beta a_{-T}(1-\cos(a))}{\cos(a)}$$

Figure 4:
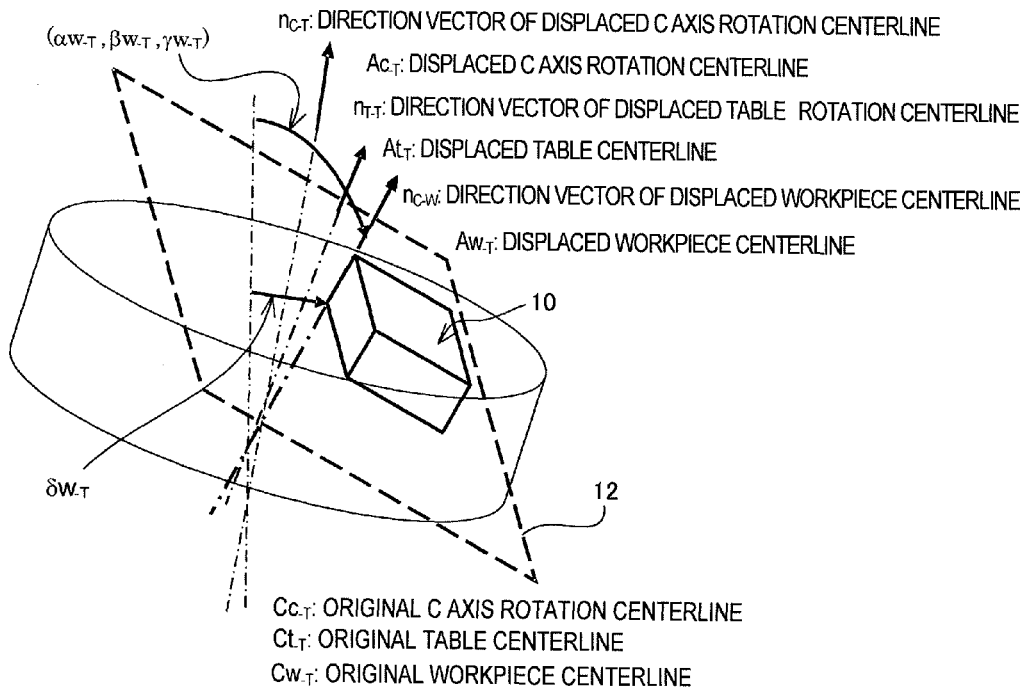
FIG. 4 is a diagram illustrating that a workpiece is installed on a displaced workpiece installation surface on the displaced table in FIG. 2.

Now, it is assumed that a workpiece is installed on the displaced table as shown in FIG. 4. More specifically, as shown in FIG. 4, it is assumed that a workpiece 10 is installed on a displaced workpiece installation surface 12 on the displaced table in FIG. 2 (the displaced workpiece 10 is placed on the displaced workpiece installation surface 12). In this case, like "$_1$) An error in the displaced table centerline $At_{-T}$ with respect to the original table centerline $Ct_{-T}$" in "<1> Target machine and errors", the following error is present.

4) An Error in a Displaced Workpiece Centerline $Aw_{-T}$ with Respect to the Original Workpiece Centerline $Cw_{-T}$:

$\delta w_{-T}$ ($\delta wx_{-T}$, $\delta wy_{-T}$, $\delta wz_{-T}$): the X component, Y component, and Z component of a deviation distance from $Cw_{-T}$ observed when A=0 and C=0 and corresponding to $Co_{-T}$ that is an intersecting point between the original A axis rotation centerline and the original C axis rotation centerline, to $Aw_{-T}$. This is a translation error in an installation assembly error during workpiece installation.

($\alpha w_{-T}$, $\beta w_{-T}$, $\gamma w_{-T}$): this indicates that, when A=0 and C=0, $Aw_{-T}$ is tilted from $Cw_{-T}$ with a rotation error $\alpha w_{-T}$ around the X axis, a rotation error $\beta w_{-T}$ around the Y axis, and a rotation error $\gamma w_{-T}$ around the Z axis. This is a rotation error in the installation error during workpiece installation.

$n_{w-T}$: a direction vector of $Aw_{-T}$. Thus, $n_{w-T}$ is normal to the actual (displaced) workpiece installation surface.

In this case, when the processing described in "<2-1> Translation error compensation amount" and "<2-2> Rotation error compensation amount" is carried out using "4) An error in a displaced workpiece centerline $Aw_{-T}$ with respect to the original workpiece centerline $Cw_{-T}$" instead of "1) An error in the displaced table centerline $At_{-T}$ with respect to the original table centerline $Ct_{-T}$", the installation error (translation error and rotation error) during work installation may also be considered to be an assembly error (translation error and rotation error) in the table surface as described above. Obviously, a resultant error of the assembly error (translation error and rotation error) in the table surface and the installation error (translation error and rotation error) during work installation may also be considered to be an assembly error (translation error and rotation error) in the table surface. Thus, the assembly error in the table surface according to the present invention includes the installation error (translation error and rotation error) during workpiece installation.

<3> Input of the Translation Error Compensation Amount and the Rotation Error Compensation Amount <3-1> Input to a Translation Error Compensation Amount and Rotation Error Compensation Amount Data Table in the Numerical Controller As disclosed in JP 2009-151756 A, some numerical controllers contain a translation error compensation amount and rotation error compensation amount data table. The translation error compensation amount and rotation error compensation amount depending on the rotation axes calculated according to the present invention are input to such a numerical controller and set in the data table in the numerical controller.

Figure 5:
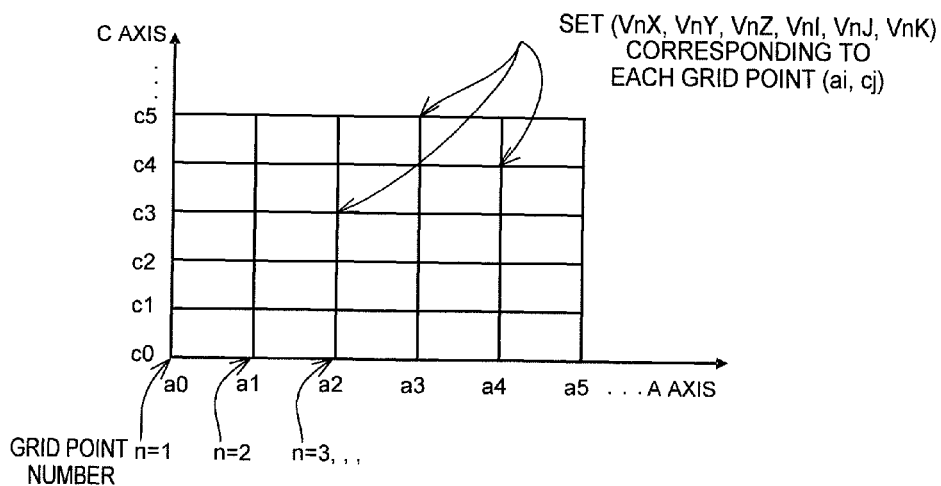
FIG. 5 is a diagram illustrating a data table for a translation error compensation amount and a rotation error compensation amount.

The data table is configured like a grid as shown in FIG. 5. The translation error compensation amount (VnX, VnY, VnZ) and the rotation error compensation amount (VnI, VnJ, VnK) corresponding to each grid point (ai, cj) (i=1, 2, ..., j=1, 2, ...) are input to and set in the numerical controller.

In this case, (ai, cj) denotes the positions of the A axis and the C axis pre-specified in the numerical controller and corresponding to each grid point, and n denotes a grid point number corresponding to a combination (i, j). Thus, the translation error compensation amount ($\Delta XR$, $\Delta YR$, $\Delta ZR$) and rotation error compensation amount ($\Delta IR$, $\Delta JR$, $\Delta KR$) depending on the rotation axes (A axis and C axis) corresponding to each grid point (ai, cj) are determined, and the resultant translation error compensation amount (VnX, VnY, VnZ) and rotation error compensation amount (VnI, VnJ, VnK) are input to and set in the numerical controller. That is, with (a, c)=(ai, cj) set, the processing described in "<2-1> Translation error compensation amount" and "<2-2> Rotation error compensation amount" is carried out to determine (ΔXR, ΔYR, ΔZR) and (ΔIR, ΔJR, ΔKR). Then, the resultant translation error compensation amount (VnX, VnY, VnZ) and rotation error compensation amount (VnI, VnJ, VnK) corresponding to (ai, cj) are input to and set in the numerical controller in accordance with:

$$VnX = \Delta XR, VnY = \Delta YR, VnZ = \Delta ZR \qquad (6)$$
$$VnI = \Delta IR, VnJ = \Delta JR, VnK = \Delta KR.$$

Figure 6:
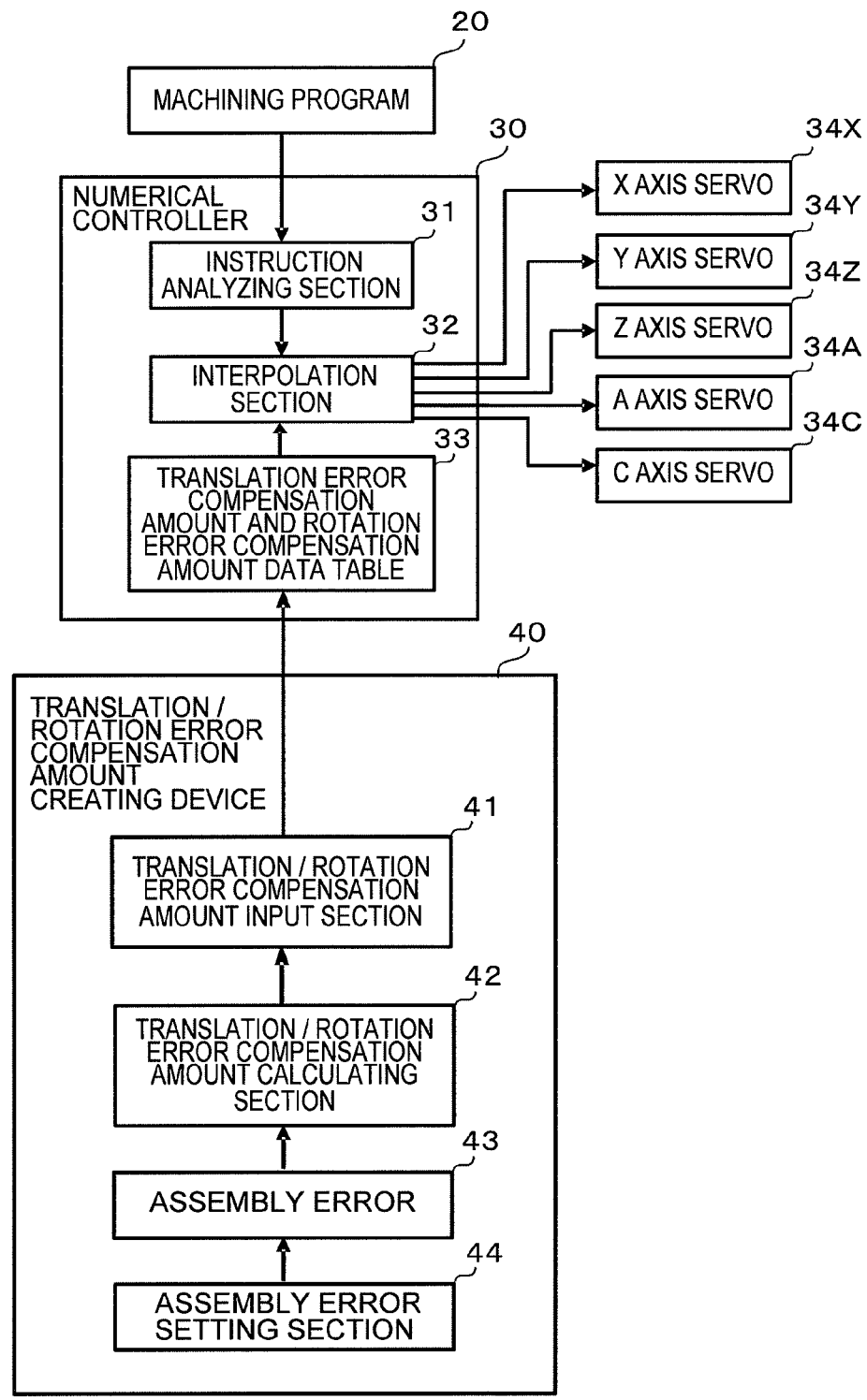
FIG. 6 is a block diagram illustrating an embodiment of a translation/rotation error compensation amount creating device according to the present invention which inputs a translation error compensation amount and a rotation error compensation amount both depending on rotation axes to a numerical controller.

In this case, a block diagram in FIG. 6 shows a first embodiment of a translation/rotation error compensation amount creating device according to the present invention which inputs the translation error compensation amount (ΔXR, ΔYR, ΔZR) and rotation error compensation amount (ΔIR, ΔJR, ΔKR) depending on the rotation axes to the numerical controller. That is, a numerical controller 30 analyzes an input machining program 20 by an instruction analyzing section 31 and carries out interpolation by an interpolation section 32 based on the analysis data. The interpolation section 32 further carries out compensation based on a translation error compensation amount and rotation error compensation amount data table 33 and the current position to drive respective axis servos 34X, 34Y, 34Z, 34A, and 34C. Thus, the numerical controller 30 controls a multi-axis machining apparatus having at least two rotation axes. The instruction analyzing section 31 and interpolation section 32 of the numerical controller 30 are collectively referred to as a numerical control section.

The compensation is performed by the interpolation section 32, but the compensation method carried out by the interpolation section 32 is a conventional technique also described in JP 2009-151756 A and will thus not particularly be described. An assembly error 43 including at least an assembly error in a table surface or an assembly error in a spindle turning centerline is set in the translation/rotation error compensation amount creating device 40 by an assembly error setting section 44. The translation/rotation error compensation amount calculating section 42 calculate the assembly error 43 and the translation error compensation amount (ΔXR, ΔYR, ΔZR) and rotation error compensation amount (ΔIR, ΔJR, ΔKR) depending on the rotation axes and corresponding to positions of two rotation axes (ai, cj), by setting (a, c)=(ai, cj) in the above-described processing. A translation/rotation error compensation amount input section 41 inputs these translation error compensation amount and the rotation error compensation amount to the numerical controller 30.

Figure 7:
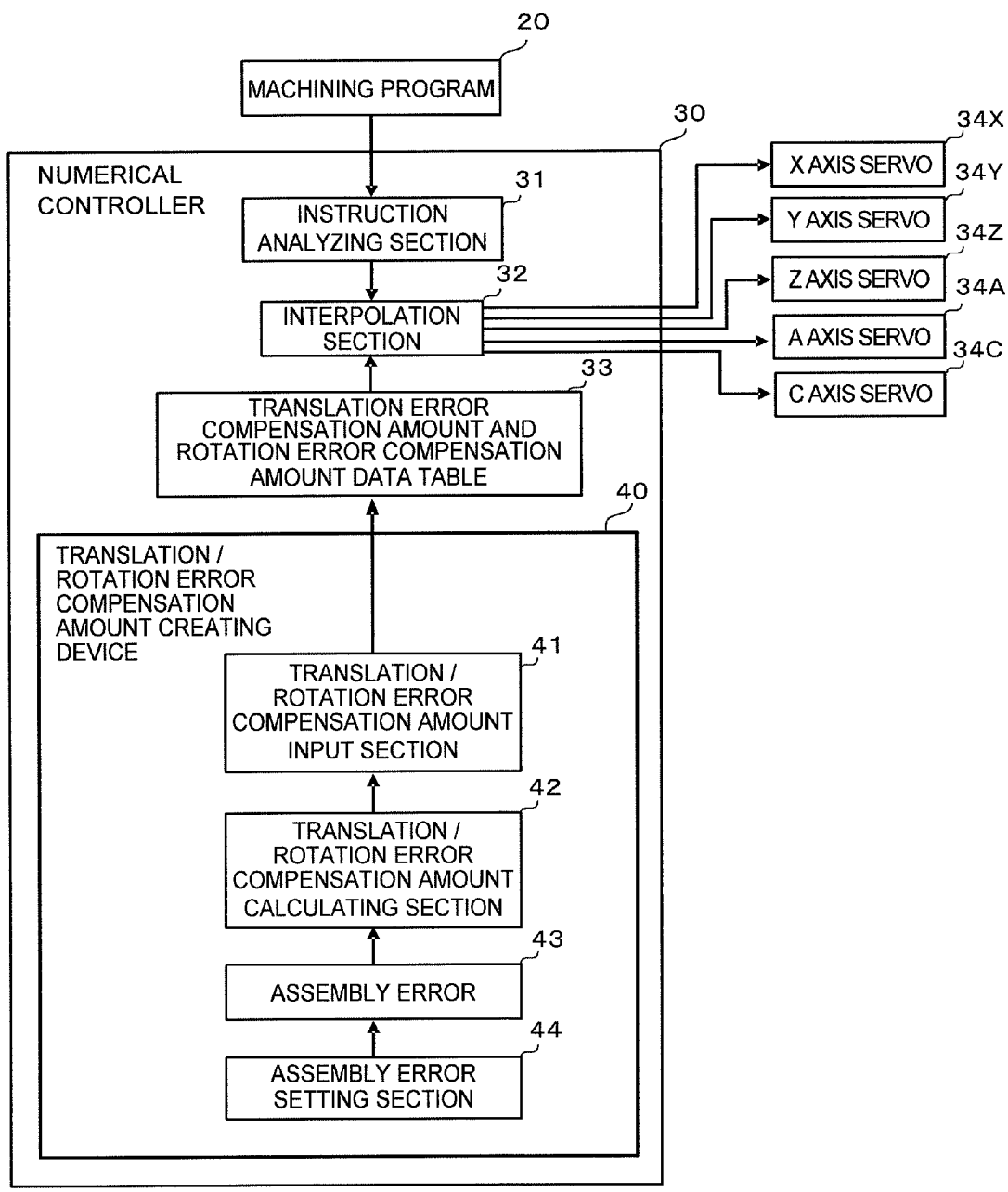
FIG. 7 is a block diagram illustrating another embodiment of the translation/rotation error compensation amount creating device according to the present invention included in the numerical controller.

Furthermore, the translation/rotation error compensation amount creating device 40 may be incorporated in the numerical controller 30 as shown in FIG. 7.

<3-2> Direct Input of the Translation Error Compensation Amount and the Rotation Error Compensation Amount to the Numerical Controller JP 2009-151756 A discloses a numerical controller that performs compensation based on the translation error compensation amount and the rotation error compensation amount. The positions (a, c) of the two rotation axes are obtained from the numerical controller, and the translation error compensation amount (ΔXR, ΔYR, ΔZR) and rotation error compensation amount (ΔIR, ΔJR, ΔKR) depending on the rotation axes, calculated according to the present invention, are input to a numerical controller 50, which then performs compensation.

Figure 9:
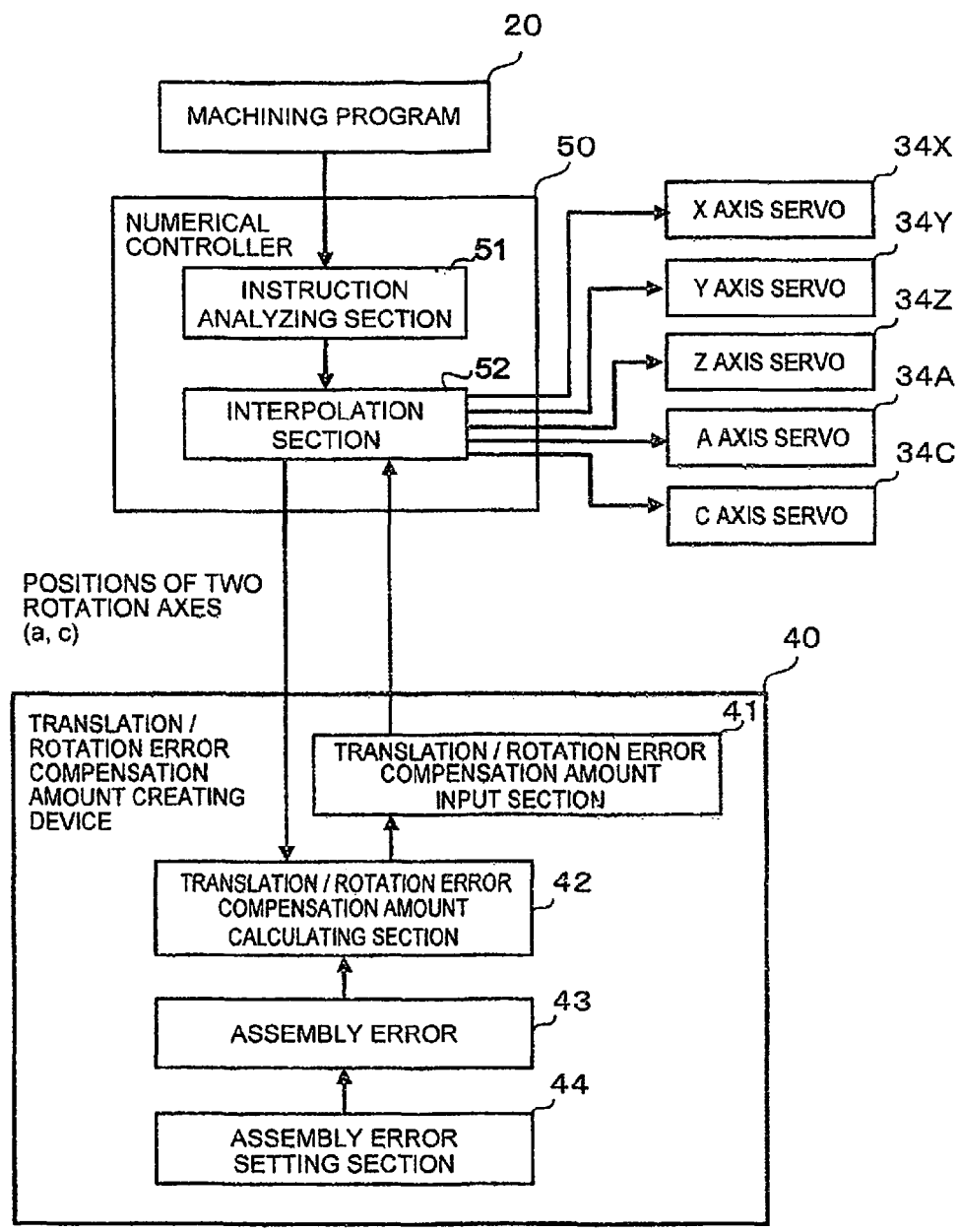
FIG. 9 is a block diagram illustrating an embodiment of the translation/rotation error compensation amount creating device according to the present invention which obtains the positions of two rotation axes from the numerical controller and which calculates the translation error compensation amount and rotation error compensation amount depending on the rotation axes and input the calculated results to the numerical controller.

In this case, a block diagram in FIG. 9 shows the first embodiment of the translation/rotation error compensation amount creating device according to the present invention which obtains the positions (a, c) of the two rotation axes and which calculates the translation error compensation amount (ΔXR, ΔYR, ΔZR) and rotation error compensation amount (ΔIR, ΔJR, ΔKR) both depending on the rotation axes and inputs the calculated result to the numerical controller. That is, a numerical controller 50 analyzes an input machining program 20 by an instruction analyzing section 51 and carries out interpolation by an interpolation section 52 based on the analysis data. The interpolation section 52 further carries out compensation based on the translation error compensation amount, the rotation error compensation amount, and the current position to drive the respective axis servos 34X, 34Y, 34Z, 34A, and 34C. The compensation method to be carried out by the interpolation section 52 is a conventional technique as described in JP 2009-151756 A mentioned above and will thus not particularly be described.

In this case, the assembly error 43 including at least the assembly error in the table surface or the assembly error in the spindle turning centerline is set in the translation/rotation error compensation amount creating device 40 by the assembly error setting section 44. The positions (a, c) of the two rotation axes are obtained from the numerical controller 50 at every interpolation period. The translation/rotation error compensation amount calculating section 42 calculates the assembly error 43 and the translation error compensation amount (ΔXR, ΔYR, ΔZR) and rotation error compensation amount (ΔIR, ΔJR, ΔKR) both depending on the rotation axes and corresponding to the positions (a, c) of the two rotation axes. The translation/rotation error compensation amount input section 41 inputs these translation error compensation amount and the rotation error compensation amount to the numerical controller 50.

Furthermore, the translation/rotation error compensation amount creating device 40 may be incorporated in the numerical controller 50 as is the case with FIG. 7.

Figure 8:
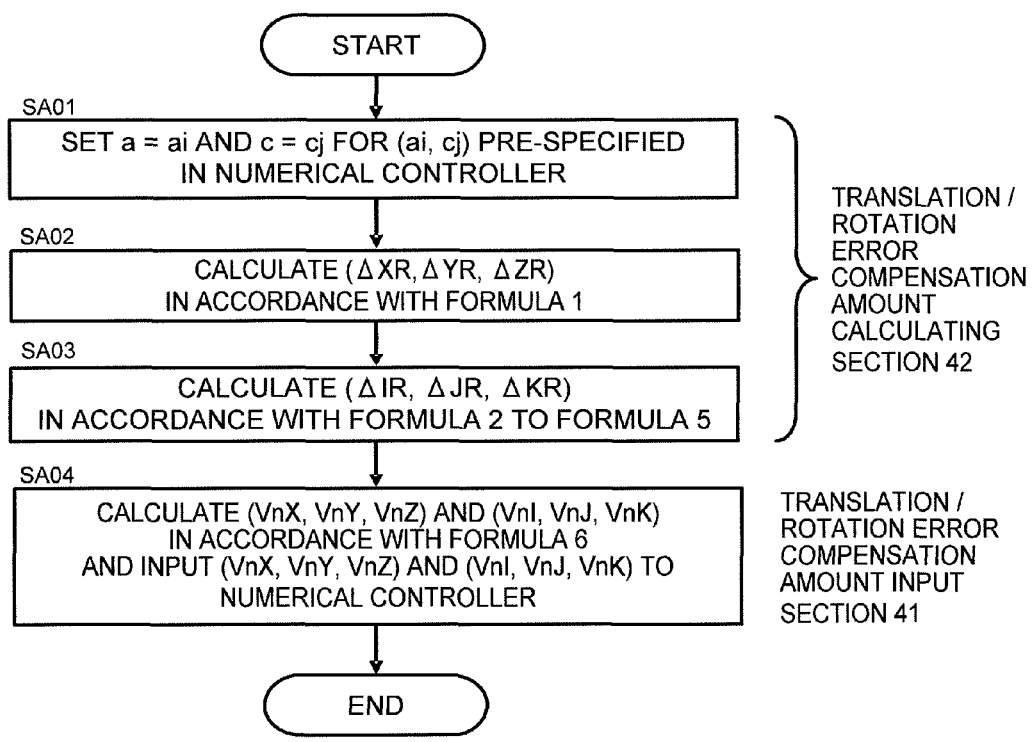
FIG. 8 is a flowchart showing a flow of processing carried out by a translation error compensation amount calculating section and a translation error compensation amount input section in a first embodiment of the translation/rotation error compensation amount creating device according to the present invention.

With reference to a flowchart in FIG. 8, a flow of processing will be described which is carried out by the translation/rotation error compensation amount calculating section 42 and translation/rotation error compensation amount input section 41 in the first embodiment of the translation/rotation error compensation amount creating device according to the present invention. The flow of the processing will be described in accordance with steps of the flowchart.

[Step SA01] The translation/rotation error compensation amount calculating section 42 sets a=ai and c=cj for the positions (ai, cj) of the A axis and the C axis corresponding to each grid point and pre-specified in the numerical controller 30.

[Step SA02] In accordance with Formula (1), the translation/rotation error compensation amount calculating section 42 calculates the translation error compensation amount (ΔXR, ΔYR, ΔZR) depending on the rotation axes and corresponding to the positions (a, c) of the A axis and the C axis.

[Step SA03] In accordance with Formulae (2) to (5), the translation/rotation error compensation amount calculating section 42 calculates the rotation error compensation amount (ΔIR, ΔJR, ΔKR) depending on the rotation axes and corresponding to the positions (a, c) of the A axis and the C axis.

[Step SA04] In accordance with Formula (6), the translation/rotation error compensation amount input section 41 calculates and inputs the translation error compensation amount (VnX, VnY, VnZ) and rotation error compensation amount (VnI, VnJ, VnK) corresponding to (ai, cj), and inputs the calculated results to the numerical controller 30, and the process is ended.

Second Embodiment

<1> Target Machine and Errors

Figure 10:
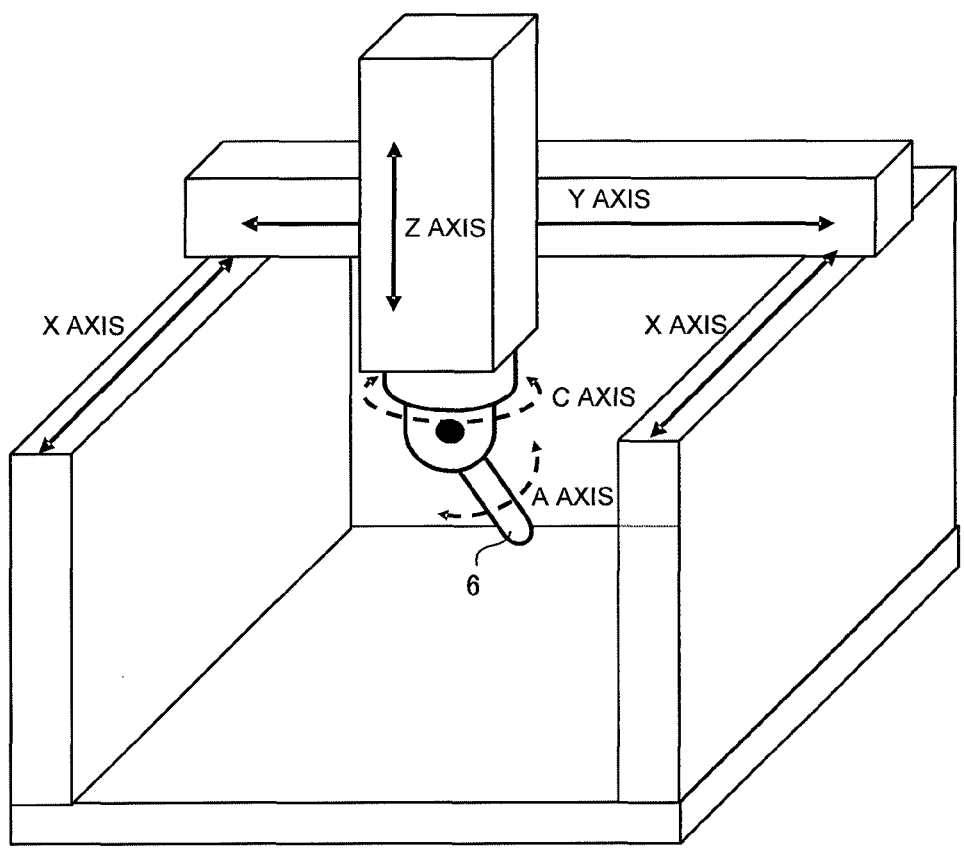
FIG. 10 is a diagram illustrating a tool head rotating multi-axis machining apparatus (5-axis machining apparatus) without any assembly error.

FIG. 10 shows a tool head rotating multi-axis machining apparatus (5-axis machining apparatus) without any assembly error. In this case, a tool head moves with respect to the X axis, the Y axis, and the Z axis, and rotates with respect the A axis and the C axis. Another axial configuration may be used if the machining apparatus includes a tool head that rotates with respect to two rotation axes.

Figure 11:
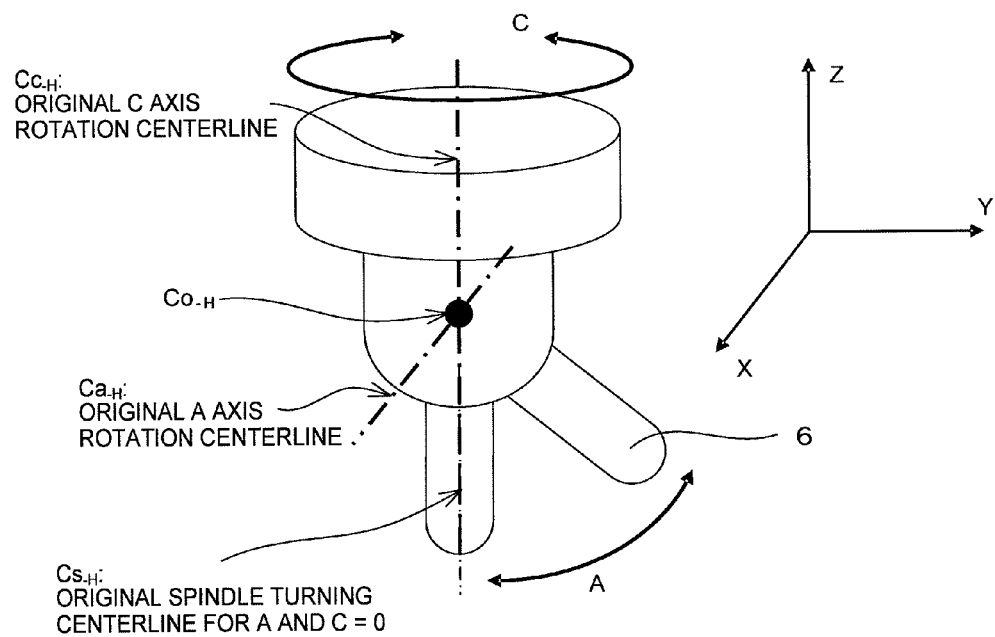
FIG. 11 is a diagram illustrating that, when A=0, a tool direction of a tool head is a Z axis direction in the tool head rotating multi-axis machining apparatus (5-axis machining apparatus) shown in FIG. 10.

When A=0, a tool direction of the tool head is a Z axis direction as shown in FIG. 11. An original A axis rotation centerline $Ca_{-H}$ is orthogonal to an original C axis rotation centerline $Cc_{-H}$, and the original C axis rotation centerline $Cc_{-H}$ coincides with an original spindle turning centerline $Cs_{-H}$. In this case, "$_{-H}$" means the data that forms an error in the tool head. A position instruction for the A axis and the C axis is denoted by (a, c).

Figure 12:
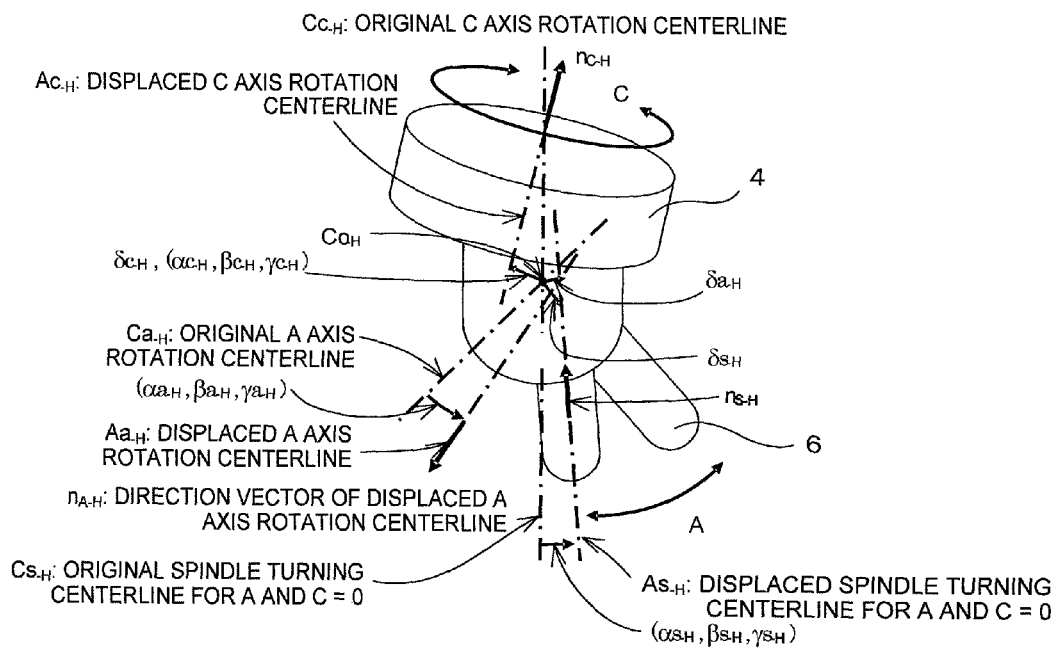
FIG. 12 is a diagram illustrating that an assembly error including an assembly error in a spindle turning centerline is represented as an error in the rotation axis rotation centerline and an error in the spindle turning centerline (translation error and rotation error)

As shown in FIG. 12, an assembly error including an assembly error in the spindle turning centerline is represented as an error in the rotation axis rotation centerline (A axis rotation centerline and C axis rotation centerline) and an error in the spindle turning centerline (translation error and rotation error). Errors are exaggerated in FIG. 12, though the actual errors are small. In FIG. 12, $\delta c_{-H}$ and ($\alpha c_{-H}$, $\beta c_{-H}$, $\gamma c_{-H}$) are originally separate vectors but are simplified and shown by one vector due to the lack of space.

Errors are represented as follows. The errors are premeasured and set by an assembly error setting section.

1) An Error in a Displaced Spindle Turning Centerline $As_{-H}$ With Respect to the Original Spindle Turning Centerline $Cs_{-H}$ $\delta s_{-H}$ ($\delta sx_{-H}$, $\delta sy_{-H}$, $\delta sz_{-H}$): the X component, Y component, and Z component of a deviation distance from $Cs_{-H}$ observed when A=0 and C=0 and corresponding to $Co_{-H}$ that is an intersecting point between the original A axis rotation centerline and the original C axis rotation centerline, to $As_{-H}$. This is a translation error in the assembly error in the spindle turning centerline.

($\alpha s_{-H}$, $\beta s_{-H}$, $\gamma s_{-H}$): this indicates that, when A=0 and C=0, $As_{-H}$ is tilted from $Cs_{-H}$ with a rotation error $\alpha s_{-H}$ around the X axis, the rotation error $\beta s_{-H}$ around the Y axis, and a rotation error $\gamma s_{-H}$ around the Z axis. This is a rotation error in the assembly error in the spindle turning centerline.

$n_{S-H}$: a direction vector of $As_{-H}$. Thus, $n_{S-H}$ is normal to the actual (displaced) spindle turning centerline direction.

2) An Error in the Displaced C Axis Rotation Centerline $Ac_{-H}$ WITH Respect to the Original C Axis Rotation Centerline $Cc_{-H}$ $\delta c_{-H}$ ($\delta cx_{-H}$, $\delta cy_{-H}$, $\delta cz_{-H}$): the X component, Y component, and Z component of a deviation distance from $Cc_{-H}$ observed when A=0 and corresponding to $Co_{-H}$ that is the intersecting point between the original A axis rotation centerline and the original C axis rotation centerline, to $Ac_{-H}$. This is a translation error in an assembly error in the C axis. As is the case with the first embodiment, $Ac_{-H}$ may vary like a top depending on the position of the C axis. Then, $\delta c_{-H}$ is $\delta c_{-H}(c)$ ($\delta cx_{-H}(c)$, $\delta cy_{-H}(c)$, $\delta cz_{-H}(c)$) varying depending on c.

Figure 13:
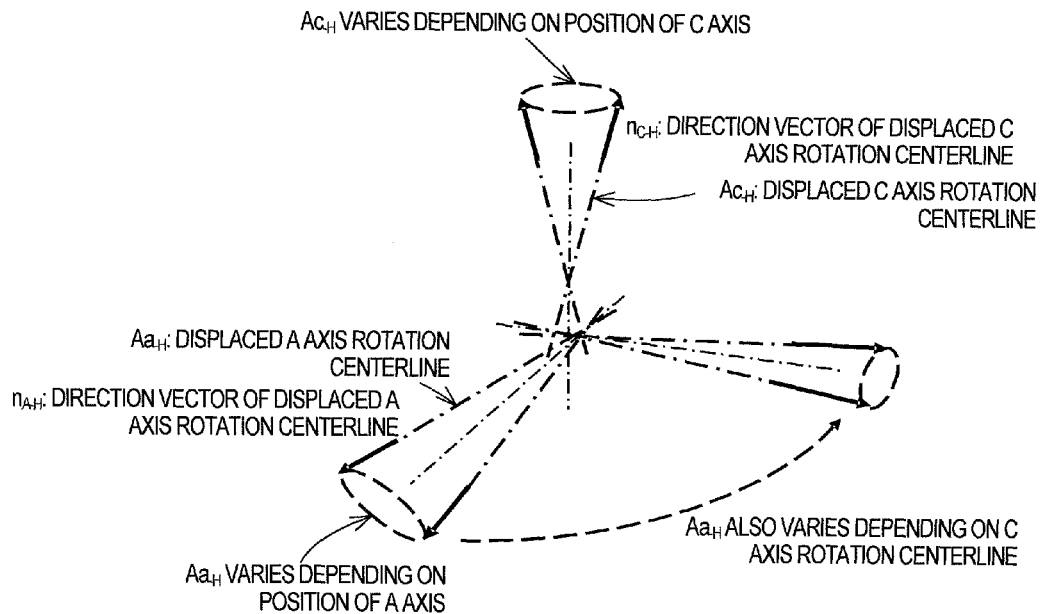
FIG. 13 is a diagram showing how the displaced rotation axis rotation centerline varies, focusing only on the rotation axis rotation centerline.

FIG. 13 illustrates how $Ac_{-H}$ and $As_{-H}$, described next, varies, focusing only on the rotation axis rotation centerline.

($\alpha c_{-H}$, $\beta c_{-H}$, $\gamma c_{-H}$): this indicates that, when A=0, $Ac_{-H}$ is tilted from $Cc_{-H}$ with a rotation error $\alpha c_{-H}$ around the X axis, a rotation error $\beta c_{-H}$ around the Y axis, and a rotation error $\gamma c_{-H}$ around the Z axis. This is a rotation error in the assembly error in the C axis. As is the case with $\delta c_{-H}$, if $Ac_{-H}$ varies depending on the position of the C axis, ($\alpha c_{-H}$, $\beta c_{-H}$, $\gamma c_{-H}$) is ($\alpha c_{-H}(c)$, $\beta c_{-H}(c)$, $\gamma c_{-H}(c)$) varying depending on c (see FIG. 13).

$n_{C-H}$: a direction vector of $Ac_{-H}$.

3) An Error in the Displaced A Axis Rotation Centerline $Aa_{-H}$ with Respect to the Original A Axis Rotation Centerline $Ca_{-H}$ $\delta a_{-H}$ ($\delta ax_{-H}$, $\delta ay_{-H}$, $\delta az_{-H}$): the X component, Y component, and Z component of a deviation distance from $Ca_{-H}$ corresponding to $Co_{-H}$ that is the intersecting point between the original A axis rotation centerline and the original C axis rotation centerline, to $Aa_{-H}$. This is a translation error in an assembly error in the A axis. As is the case with $\delta c_{-H}$, if $Aa_{-H}$ varies depending on the position of the A axis, $\delta a_{-H}$ is $\delta a_{-H}(a)$ ($\delta ax_{-H}(a)$, $\delta ay_{-H}(a)$, $\delta az_{-H}(a)$) varying depending on a. Moreover, $Aa_{-H}$ may be affected by the position of the other axis. If $As_{-H}$ is affected by the position of the C axis, $\delta a_{-H}$ is $\delta a_{-H}(a, c)$ ($\delta ax_{-H}(a, c)$, $\delta ay_{-H}(a, c)$, $\delta az_{-H}(a, c)$) varying depending on (a, c) (see FIG. 13).

($\alpha a_{-H}$, $\beta_{-H}$, $\gamma a_{-H}$): this indicates that $Aa_{-H}$ is tilted from $Ca_{-H}$ with a rotation error $\alpha a_{-H}$ around the X axis, a rotation error $\beta a_{-H}$ around the Y axis, and a rotation error $\gamma a_{-H}$ around the Z axis. This is a rotation error in the assembly error in the A axis. As is the case with $\delta a_{-H}$, if $Aa_{-H}$ varies depending on the position of the A axis, ($\alpha a_{-H}$, $\beta a_{-H}$, $\gamma a_{-H}$) is ($\alpha a_{-H}(a)$, $\beta a_{-H}(a)$, $\gamma a_{-H}(a)$) varying depending on a. If $Aa_{-H}$ is affected by the other axis (C axis) position, ($\alpha a_{-H}$, $\beta a_{-H}$, $\gamma a_{-H}$) is ($\alpha a_{-H}(a, c)$, $\beta a_{-H}(a, c)$, $\gamma a_{-H}(a, c)$) varying depending on (a, c) (see FIG. 13).

$n_{A-H}$: a direction vector of $Aa_{-H}$.

<2> Translation Error Compensation Amount and Rotation Error Compensation Amount Depending on the Rotation Axes An assembly error in the spindle turning centerline (translation error $\delta s_{-H}$ ($\delta sx_{-H}$, $\delta sy_{-H}$, $\delta sz_{-H}$) and a rotation error ($\alpha s_{-H}$, $\beta s_{-H}$, $\gamma s_{-H}$) are focused on. Then, when A=0 and C=0, a translation error compensation amount ($\Delta$XR, $\Delta$YR, $\Delta$ZR) and a rotation error compensation amount ($\Delta$IR, $\Delta$JR, $\Delta$KR) both depending on the rotation axes (A axis and C axis) are $-\delta s_{-H}$ ($-\delta sx_{-H}$, $-\delta sy_{-H}$, $-\delta sz_{-H}$) and ($-\alpha s_{-H}$, $-\beta s_{-H}$, $-\gamma s_{-H}$), respectively.

Errors in the tool head are compensated so as to be retracted, and thus, the compensation amount is equal to the error in the tool head the sign of which is inverted. When A=a and C=c, $\delta s_{-H}$ and ($\alpha s_{-H}$, $\delta s_{-H}$, $\gamma s_{-H}$) are varied as follows by rotation of the A axis and the C axis.

When the tool head rotates so that A=a and C=c, a translation/rotation error compensation amount calculating section 42 (see FIG. 9) carries out a calculation for a case where the tool head rotates around the actual A axis (displaced A axis, $Aa_{-H}$) by a and around the actual C axis (displaced C axis, $Ac_{-H}$) by c.

<2-1> Translation Error Compensation Amount

A translation error $\delta s_{-H}$ ($\delta sx_{-H}$, $\delta sy_{-H}$, $\delta sz_{-H}$) in the spindle turning centerline is rotated around the displaced A axis rotation centerline $Aa_{-H}$ by a and further around the displaced C axis rotation centerline $Ac_{-H}$ by c.

A matrix that rotates, by a, around a vector $n_{A\text{-}H}$ indicative of the direction of $Aa_{-H}$ is denoted by $Ma_{-H}$.

A matrix that rotates, by c, around a vector $n_{C\text{-}H}$ indicative of the direction of $Ac_{-H}$ when A=0 is denoted by $Mc_{-H}$. The expression "A translation error $\delta s_{-H}$ ($\delta sx_{-H}$, $\delta sy_{-H}$, $\delta sz_{-H}$) in the spindle turning centerline is rotated around the displaced A axis rotation centerline $Aa_{-H}$ by a and further around the displaced C axis rotation centerline $Ac_{-H}$ by c" means that $\delta s_{-H}$ ($\delta sx_{-H}$, $\delta sy_{-H}$, $\delta sz_{-H}$) is rotated around $n_{A\text{-}H}$ in $\delta a_{-H}$ by a and further around $n_{C\text{-}H}$ in $\delta c_{-H}$ by c. Moreover, the translation error compensation amount is a sign inverted value of the translation error. Thus, the translation error compensation amount ($\Delta XR$, $\Delta YR$, $\Delta ZR$) corresponding to the position of the A axis (a) and the position of the C axis (c) (that is, depending on the rotation axes) are as expressed by:

$$\begin{bmatrix} \Delta XR \\ \Delta YR \\ \Delta ZR \end{bmatrix} = -Mc_{-H} * \{Ma_{-H} * (\delta s_{-H} - \delta a_{-H}) + \delta a_{-H} - \delta c_{-H}\} - \delta c_{-H} \quad (7)$$

$$= \begin{bmatrix} -(\delta sx_{-H} - \delta cx_{-H})\cos(c) + \{(\delta sy_{-H} - \delta ay_{-H})\cos(a) - \\ (\delta sz_{-H} - \delta az_{-H})\sin(a) + (\delta ay_{-H} - \delta cy_{-H})\} \\ \sin(c) - \delta cx_{-H} \\ -(\delta sx_{-H} - \delta cx_{-H})\sin(c) + \{-(\delta sy_{-H} - \delta ay_{-H})\cos(a) + \\ (\delta sz_{-H} - \delta az_{-H})\sin(a) - \\ (\delta ay_{-H} - \delta cy_{-H})\}\cos(c) - \delta cy_{-H} \\ -(\delta sy_{-H} - \delta ay_{-H})\sin(a) - \\ (\delta sz_{-H} - \delta az_{-H})\cos(a) - \delta az_{-H} \end{bmatrix}.$$

<2-2> Rotation Error Compensation Amount ($\alpha s_{-H}$, $\beta s_{-H}$, $\gamma s_{-H}$) rotates around the displaced A axis rotation centerline $Aa_{-H}$ by a and further around the displaced C axis rotation centerline $Ac_{-H}$ by c. A vector obtained in the correct spindle turning centerline direction when A=a and C=c is denoted by $nz_{-H}$. When A=a and C=c, a rotation matrix $M_I$ based on the rotation error compensation amount ($\Delta IR$, $\Delta JR$, $\Delta KR$) corresponding to the position of the vector (that is, depending on the rotation axes) is, as with the case with the first embodiment, expressed by:

$$M_I = \begin{bmatrix} 1 & -\Delta KR & \Delta JR \\ \Delta KR & 1 & -\Delta IR \\ -\Delta JR & \Delta IR & 1 \end{bmatrix}. \quad (8)$$

The vector $nz_{-H}$ corresponds to a direction obtained by compensation, using the rotation error compensation amount ($\Delta IR$, $\Delta JR$, $\Delta KR$), of a direction resulting from rotation of the direction vector $n_{S\text{-}H}$ around the A axis rotation centerline $Aa_{-H}$ by a and further around the C axis rotation centerline $Ac_{-H}$ by c. Thus, Formula (9) holds true.

$$\begin{bmatrix} \{\beta s_{-H} - \beta a_{-H}(1-\cos(a)) + \gamma a_{-H}\sin(a)\}\cos(c) + \\ \{\alpha s_{-H}\cos(a) + \sin(a)\}\sin(c) + \\ \{\beta c_{-H}(1-\cos(c)) - \alpha c_{-H}\sin(c)\}\cos(a) \\ \{\beta s_{-H} - \beta a_{-H}(1-\cos(a)) + \gamma a_{-H}\sin(a)\}\sin(c) - \\ \{\alpha s_{-H}\cos(a) + \sin(a)\}\cos(c) + \\ \{-\alpha c_{-H}(1-\cos(c)) - \beta c_{-H}\sin(c)\}\cos(a) \\ -\{-\alpha c_{-H}(1-\cos(c)) + \beta c_{-H}\sin(c)\}\sin(a) - \alpha s_{-H}\sin(a) + \cos(a) \end{bmatrix} = \quad (9)$$

$$\begin{bmatrix} \sin(c)\sin(a) - \Delta KR\cos(c)\sin(a) - \Delta JR\cos(a) \\ -\Delta KR\sin(c)\sin(a) - \cos(c)\sin(a) + \Delta IR\cos(a) \\ \Delta JR\sin(c)\sin(a) + \Delta IR\cos(c)\sin(a) + \cos(a) \end{bmatrix}$$

Given −85 degrees<a<85 degrees as is the case with the first embodiment, Formula (10) is obtained from Formula (9). The rotation error compensation amount ($\Delta IR$, $\Delta JR$, $\Delta KR$) depending on the rotation axes is determined as described above. Of course, another solution meets Formula (9).

$$\Delta IR = \beta a_{-H}\sin(c) - \alpha s_{-H}\cos(c) - \quad (10)$$
$$\alpha c_{-H}(1-\cos(c)) - \beta c_{-H}\sin(c) + \frac{(\beta s_{-H} - \beta a_{-H})\sin(c)}{\cos(a)}$$

$$\Delta JR = -\beta a_{-H}\cos(c) - \alpha s_{-H}\sin(c) + \alpha c_{-H}\sin(c) -$$
$$\beta c_{-H}(1-\cos(c)) - \frac{(\beta s_{-H} - \beta a_{-H})\cos(c)}{\cos(a)}$$

$$\Delta KR = -\gamma a_{-H}$$

<3> Input of the Translation Error Compensation Amount and the Rotation Error Compensation Amount This aspect is the same as the corresponding aspect of the first embodiment and will not be described below.

Third Embodiment

<1> Target Machine and Errors

Figure 14:
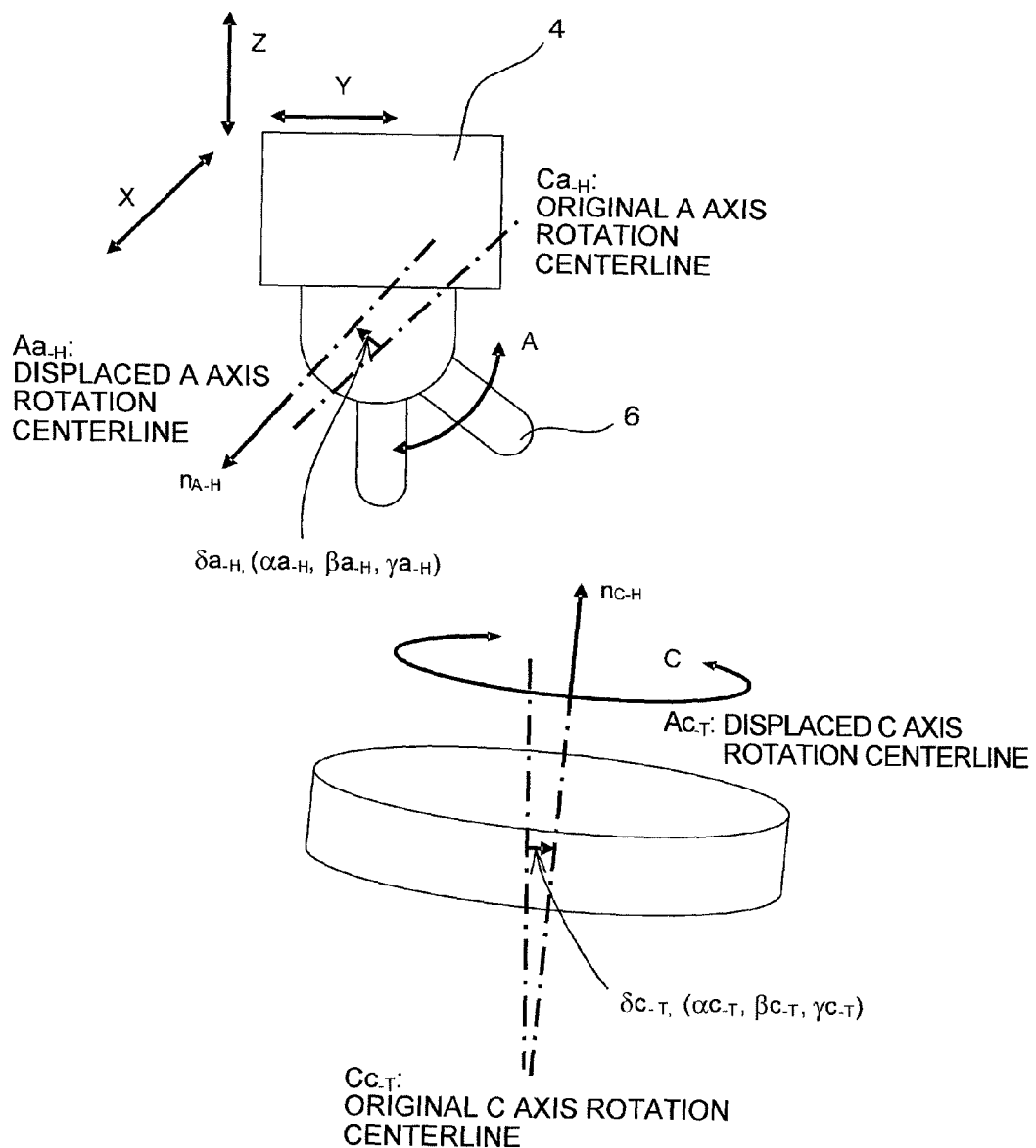
FIG. 14 is a diagram illustrating a mixed multi-axis machining apparatus (5-axis machining apparatus) to which the translation/rotation error compensation amount creating device according to the present invention is applied.

FIG. 14 shows a mixed multi-axis machining apparatus (5-axis machining apparatus) to which the translation/rotation error compensation amount creating device according to the present invention is applied. In this case, a tool head moves with respect to the X axis, the Y axis, and the Z axis, and rotates with respect the A axis, and a table rotates with respect to the C axis. Another axial configuration may be used if the machining apparatus includes a tool head that rotates with respect to one of the rotation axes and a table that rotates with respect to the other rotation axis.

The present embodiment is the same as the second embodiment except that the tool head rotates with respect to one rotation axis instead of two rotation axes, and also the same as the first embodiment except that the table rotates with respect to one axis rather than two axes. Thus, the description of the third embodiment is simplified.

In FIG. 14, for example, $\delta a_{-H}$ and ($\alpha a_{-H}$, $\beta a_{-H}$, $\gamma a_{-H}$), like $\delta c_{-H}$ and ($\alpha c_{-H}$, $\beta c_{-H}$, $\gamma c_{-H}$) in FIG. 12, are originally separate vectors but are simplified and shown by one vector due to the lack of space.

<2> Translation Error Compensation Amount and Rotation Error Compensation Amount Depending on the Rotation Axes The calculation for only the C axis according to the first embodiment is carried out. That is, with a=0, $\alpha a_{\_T}=0$, $\beta a_{\_T}=0$, $\gamma a_{\_T}=0$, $\delta ax_{\_T}=0$, $\delta ay_{\_T}=0$, and $\delta az_{\_T}=0$ set, a translation error compensation amount ($\Delta XC$, $\Delta YC$, $\Delta ZC$) and a rotation error compensation amount ($\Delta IC$, $\Delta JC$, $\Delta KC$) both depending on the rotation axis (C axis) according to the first embodiment are determined.

The calculation for only the A axis according to the second embodiment is carried out. That is, with c=0, $\alpha c_{\_H}=0$, $\beta c_{\_H}=0$, $\gamma c_{\_H}=0$, $\delta cx_{\_H}=0$, $\delta cy_{\_H}=0$, and $\delta cz_{\_H}=0$ set, a translation error compensation amount ($\Delta XA$, $\Delta YA$, $\Delta ZA$) and a rotation error compensation amount ($\Delta IA$, $\Delta JA$, $\Delta KA$) both depending on the rotation axis (A axis) according to the second embodiment are determined.

Figure 15:
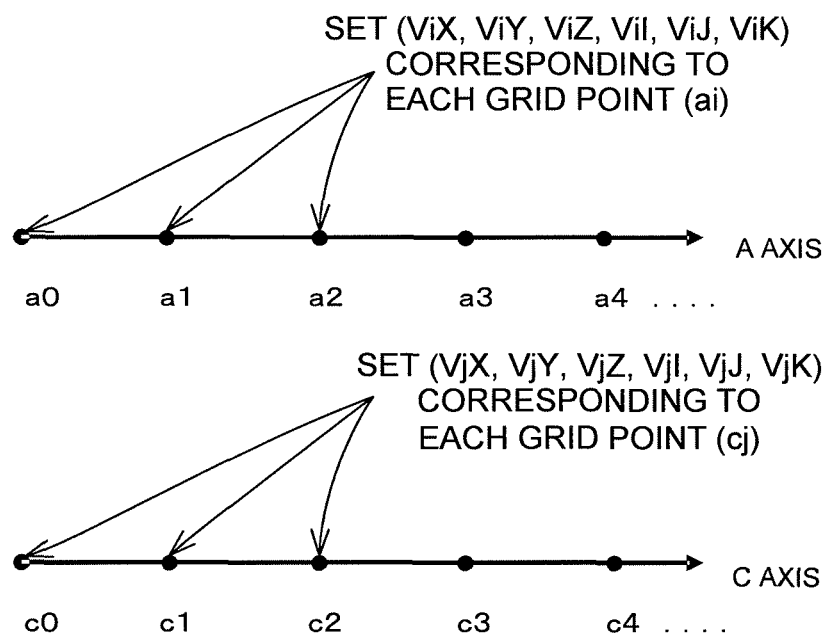
FIG. 15 is a diagram illustrating one-dimensional data tables for a C axis and an A axis, respectively.

<3> Input of the Translation Error Compensation Amount and the Rotation Error Compensation Amount <3-1> Input to a Translation Error Compensation Amount and Rotation Error Compensation Amount Data Table in the Numerical Controller According to the conventional art, such a one-dimensional data table as shown in FIG. 15 is provided for each of the C axis and the A axis. A translation error compensation amount (ViX, ViY, ViZ) and a rotation error compensation amount (ViI, ViJ, ViK) both corresponding to each grid point (ai) (i=1, 2, . . . ) are input to and set in the data tables.

Thus, the translation error compensation amount ($\Delta XA$, $\Delta YA$, $\Delta ZA$) and rotation error compensation amount ($\Delta IA$, $\Delta JA$, $\Delta KA$) both depending on the A axis and corresponding to each grid point (ai) are determined, and are input to and set in the numerical controller as the translation error compensation amount (ViX, ViY, ViZ) and the rotation error compensation amount (ViI, ViJ, ViK). That is, the translation/rotation error compensation amount creating device sets a equal to ai (a=ai) and determines the translation error compensation amount ($\Delta XA$, $\Delta YA$, $\Delta ZA$) and rotation error compensation amount ($\Delta IA$, $\Delta JA$, $\Delta KA$) both depending on the rotation axis (A axis). The translation/rotation error compensation amount creating device then inputs and sets the determined ($\Delta XA$, $\Delta YA$, $\Delta ZA$) and ($\Delta IA$, $\Delta JA$, $\Delta KA$) as translation error compensation amount (ViX, ViY, ViZ) and rotation error compensation amount (ViI, ViJ, ViK) corresponding to (ai) in the numerical controller in accordance with:

$$ViX = \Delta XA, ViY = \Delta YA, ViZ = \Delta ZA \quad (11)$$

$$ViI = \Delta IA, ViJ = \Delta JA, ViK = \Delta KA.$$

The translation/rotation error compensation amount creating device is also configured to input and set a translation error compensation amount (VjX, VjY, VjZ) and a rotation error compensation amount (VjI, VjJ, VjK) both corresponding to each grid point (cj) (j=1, 2, . . . ) in the numerical controller. Thus, the translation/rotation error compensation amount creating device similarly determines the translation error compensation amount ($\Delta XC$, $\Delta YC$, $\Delta ZC$) and rotation error compensation amount ($\Delta IC$, $\Delta JC$, $\Delta KC$) depending on the rotation axis (C axis) and corresponding to each grid point (cj). The translation/rotation error compensation amount creating device then inputs and sets the determined ($\Delta XC$, $\Delta YC$, $\Delta ZC$) and ($\Delta IC$, $\Delta JC$, $\Delta KC$) as translation error compensation amount (VjX, VjY, VjZ) and rotation error compensation amount (VjI, VjJ, VjK) in the numerical controller.

In this case, a block diagram in FIG. 6 or FIG. 7 shows a third embodiment of the translation/rotation error compensation amount creating device according to the present invention which inputs the translation error compensation amount and rotation error compensation amount depending on the rotation axis to the numerical controller.

<3-2> Direct Input of the Translation Error Compensation Amount and the Rotation Error Compensation Amount to the Numerical Controller Some numerical controllers perform compensation based on the translation error compensation amount and the rotation error compensation amount as disclosed in JP 2009-151756 A. The translation/rotation error compensation amount creating device 40 obtains the positions (a, c) of the two rotation axes from such a numerical controller 50 as described above. The translation/rotation error compensation amount creating device 40 then inputs the translation error compensation amounts ($\Delta XA$, $\Delta YA$, $\Delta ZA$) and ($\Delta XC$, $\Delta YC$, $\Delta ZC$) and rotation error compensation amounts ($\Delta IA$, $\Delta JA$, $\Delta KA$) and ($\Delta IC$, $\Delta JC$, $\Delta KC$) determined as described above and depending on the rotation axes to the numerical controller 50. The numerical controller 50 perform compensation based on the input values. In this case, the block diagram in FIG. 9 shows the third embodiment of the translation/rotation error compensation amount creating device according to the present invention which obtains the positions (a, c) of the two rotation axes from the numerical controller and which calculates and inputs the translation error compensation amount and rotation error compensation amount depending on the rotation axes to the numerical controller. Furthermore, the translation/rotation error compensation amount creating device 40 may be incorporated in the numerical controller 50 as is the case with the first embodiment.

What is claimed is:
1. A translation/rotation error compensation amount creating device for creating, for a multi-axis machining apparatus having at least two rotation axes, a translation error compensation amount and a rotation error compensation amount both depending on the rotation axes, the translation/rotation error compensation amount creating device comprising:
an assembly error setting section configured to preset an assembly error including at least an assembly error in a table surface or an assembly error in a spindle turning centerline in the multi-axis machining apparatus;
a translation/rotation error compensation amount calculating section configured to calculate
the translation error compensation amount by a first arithmetic expression based on the assembly error and positions of the two rotation axes, and
the rotation error compensation amount by a second arithmetic expression for solving an equation based on
a correct direction vector of the table surface or the spindle turning centerline based on the positions of the two rotation axes,
the rotation error compensation amount,
the assembly error, and an actual direction vector of the table surface or the spindle turning centerline based on the positions of the two rotation axes; and a translation/rotation error compensation amount input section configured to input the calculated translation error compensation amount and the rotation error compensation amount to a translation error compensation amount and rotation error compensation amount data table in a numerical controller controlling the multi-axis machining apparatus, wherein the multi-axis machining apparatus is a table rotating multi-axis machining apparatus having a rotary table, the translation/rotation error compensation amount creating device is configured to convert the assembly error in the table surface in the table rotating multi-axis machining apparatus into the translation error compensation amount and the rotation error compensation amount both depending on the rotation axes, the two rotation axes include an A axis and a C axis, the first arithmetic expression for calculating the translation error compensation amount ($\Delta XR$, $\Delta YR$, $\Delta ZR$) corresponding to a position (a) of the A axis and a position (c) of the C axis is as follows:

$$\begin{bmatrix} \Delta XR \\ \Delta YR \\ \Delta ZR \end{bmatrix} = Ma_T^* \{Mc_T^*(\delta t_{-T} - \delta c_{-T}) + \delta c_{-T} - \delta a_{-T}\} + \delta a_{-T}$$

$$= \begin{bmatrix} (\delta tx_{-T} - \delta cx_{-T})\cos(c) + (\delta ty_{-T} - \delta cy_{-T})\sin(c) + \delta cx_{-T} \\ \{-(\delta ty_{-T} - \delta cy_{-T})\sin(c) + (\delta ty_{-T} - \delta cy_{-T})\cos(c) + \\ \delta cy_{-T} - \delta ay_{-T}\}\cos(a) + (\delta tz_{-T} - \delta az_{-T})\sin(a) + \delta ay_{-T} \\ -\{-(\delta ty_{-T} - \delta cy_{-T})\sin(c) + (\delta ty_{-T} - \delta cy_{-T})\cos(c) + \\ \delta cy_{-T} - \delta ay_{-T}\}\sin(a) + (\delta tz_{-T} - \delta az_{-T})\cos(a) + \delta az_{-T} \end{bmatrix},$$

and the second arithmetic expression for calculating the rotation error compensation amount ($\Delta IR$, $\Delta JR$, $\Delta KR$) is as follows:

$$\begin{bmatrix} \beta t_{-T}\cos(c) - \alpha t_{-T}\sin(c) + \beta c_{-T}(1 - \cos(c)) + \alpha c_{-T}\sin(c) - \\ \beta a_{-T}(1 - \cos(a)) - \gamma a_{-T}\sin(a) \\ \{-\beta t_{-T}\sin(c) - \alpha t_{-T}\cos(c) - \alpha c_{-T}(1 - \cos(c)) + \\ \beta c_{-T}\sin(c)\}\cos(a) + \sin(a) \\ -\{-\beta t_{-T}\sin(c) - \alpha t_{-T}\cos(c) - \alpha c_{-T}(1 - \cos(c)) + \\ \beta c_{-T}\sin(c)\}\sin(a) + \cos(a) \end{bmatrix} =$$

$$\begin{bmatrix} -\Delta KR\sin(a) + \Delta JR\cos(a) \\ \sin(a) - \Delta IR\cos(a) \\ \Delta IR\sin(a) + \cos(a) \end{bmatrix}$$

where an error in a displaced table centerline $At_{-T}$ with respect to an original table centerline $Ct_{-T}$ is as follows:

$\delta tx_{-T}$, $\delta ty_{-T}$, $\delta tz_{-T}$ are an X component, a Y component, and a Z component, respectively, of a deviation distance between $At_{-T}$ and $Ct_{-T}$ observed when A=0 and C=0 and corresponding to $Co_{-T}$ that is an intersecting point between an original A axis rotation centerline $Ca_{-T}$ and an original C axis rotation centerline $Cc_{-T}$, $\alpha t_{-T}$, $\beta t_{-T}$, $\gamma t_{-T}$ indicate that, when A=0 and C=0, $At_{-T}$ is tilted from $Ct_{-T}$ with a rotation error $\alpha t_{-T}$ around an X axis, a rotation error $\beta t_{-T}$ around a Y axis, and a rotation error $\gamma t_{-T}$ around a Z axis, respectively, and $n_{T-T}$ is a direction vector of $At_{-T}$, an error in a displaced C axis rotation centerline $Ac_{-T}$ with respect to the original C axis rotation centerline $Cc_{-T}$ is as follows:

$\delta cx_{-T}$, $\delta cy_{-T}$, $\delta cz_{-T}$ are the X component, Y component, and Z component, respectively, of a deviation distance between $Ac_{-T}$ and $Cc_{-T}$ observed when A=0 and corresponding to $Co_{-T}$ that is the intersecting point between the original A axis rotation centerline and the original C axis rotation centerline, $\alpha c_{-T}$, $\beta c_{-T}$, $\gamma c_{-T}$ indicate that, when A=0, $Ac_{-T}$ is tilted from $Cc_{-T}$ with a rotation error $\alpha c_{-T}$ around the X axis, a rotation error $\beta c_{-T}$ around the Y axis, and a rotation error $\gamma c_{-T}$ around the Z axis, respectively, and $n_{C-T}$ is a direction vector of $Ac_{-T}$, an error in a displaced A axis rotation centerline $Aa_{-T}$ with respect to the original A axis rotation centerline $Ca_{-T}$ is as follows:

$\delta ax_{-T}$, $\delta ay_{-T}$, $\delta az_{-T}$ are the X component, Y component, and Z component, respectively, of a deviation distance between $Aa_{-T}$ and $Ca_{-T}$ corresponding to $Co_{-T}$ that is the intersecting point between the original A axis rotation centerline and the original C axis rotation centerline, $\alpha a_{-T}$, $\beta a_{-T}$, $\gamma a_{-T}$ indicate that $Aa_{-T}$ is tilted from $Ca_{-T}$ with a rotation error $\alpha a_{-T}$ around the X axis, a rotation error $\beta a_{-T}$ around the Y axis, and a rotation error $\gamma a_{-T}$ around the Z axis, respectively, and $n_{A-T}$ is a direction vector of $Aa_{-T}$, $Mc_{-T}$ is a matrix that rotates, by −c, around the vector $n_{C-T}$ indicative of the direction of $Ac_{-T}$ observed when A=0, and $Ma_{-T}$ is a matrix that rotates, by −a, around the vector $n_{A-T}$ indicative of the direction of $Aa_{-T}$.

2. A translation/rotation error compensation amount creating device for creating, for a multi-axis machining apparatus having at least two rotation axes, a translation error compensation amount and a rotation error compensation amount both depending on the rotation axes, the translation/rotation error compensation amount creating device comprising:

an assembly error setting section configured to preset an assembly error including at least an assembly error in a table surface or an assembly error in a spindle turning centerline in the multi-axis machining apparatus;

a translation/rotation error compensation amount calculating section configured to calculate the translation error compensation amount by a first arithmetic expression based on the assembly error and positions of the two rotation axes, and the rotation error compensation amount by a second arithmetic expression for solving an equation based on a correct direction vector of the table surface or the spindle turning centerline based on the positions of the two rotation axes, the rotation error compensation amount, the assembly error, and an actual direction vector of the table surface or the spindle turning centerline based on the positions of the two rotation axes; and a translation/rotation error compensation amount input section configured to input the calculated translation error compensation amount and the rotation error compensation amount to a translation error compensation amount and rotation error compensation amount data table in a numerical controller controlling the multi-axis machining apparatus, wherein the multi-axis machining apparatus is a tool head rotating multi-axis machining apparatus, the translation/rotation error compensation amount creating device is configured to convert the assembly error in the spindle turning centerline in the tool head rotating multi-axis machining apparatus into the translation error compensation amount and the rotation error compensation amount both depending on the rotation axes, the two rotation axes include an A axis and a C axis, the first arithmetic expression for calculating the translation error compensation amount ($\Delta XR$, $\Delta YR$, $\Delta ZR$) corresponding to a position (a) of the A axis and a position (c) of the C axis is as follows:

$$\begin{bmatrix} \Delta XR \\ \Delta YR \\ \Delta ZR \end{bmatrix} = Mc_H^* \{ Ma_H^* (\delta s_{-H} - \delta a_{-H}) + \delta a_{-H} - \delta c_{-H} \} - \delta c_{-H}$$

$$= \begin{bmatrix} -(\delta s x_{-H} - \delta c x_{-H})\cos(c) + \{(\delta s y_{-H} - \delta a y_{-H})\cos(a) - \\ (\delta s z_{-H} - \delta a z_{-H})\sin(a) + (\delta a y_{-H} - \delta c y_{-H})\} \sin(c) - \delta c x_{-H} \\ -(\delta s x_{-H} - \delta c x_{-H})\sin(c) + \{-(\delta s y_{-H} - \delta a y_{-H})\cos(a) + \\ (\delta s z_{-H} - \delta a z_{-H})\sin(a) - (\delta a y_{-H} - \delta c y_{-H})\}\cos(c) - \delta c y_{-H} \\ -(\delta s y_{-H} - \delta a y_{-H})\sin(a) - (\delta s z_{-H} - \delta a z_{-H})\cos(a) + \delta a z_{-H} \end{bmatrix},$$

and the second arithmetic expression for calculating the rotation error compensation amount ($\Delta IR$, $\Delta JR$, $\Delta KR$) is as follows:

$$\begin{bmatrix} \{\beta s_{-H} - \beta a_{-H}(1-\cos(a)) + \gamma \alpha_{-H} \sin(a)\}\cos(c) + \{\alpha s_{-H}\cos(a) + \\ \sin(a)\}\sin(c) + \{\beta c_{-H}(1-\cos(c)) - \alpha c_{-H}\sin(c)\}\cos(a) \\ \{\beta s_{-H} - \beta a_{-H}(1-\cos(a)) + \gamma \alpha_{-H}\sin(a)\}\sin(c) - \{\alpha s_{-H}\cos(a) + \\ \sin(a)\}\cos(c) + \{-\alpha c_{-H}(1-\cos(c)) - \beta c_{-H}\sin(c)\}\cos(a) \\ -\{-\alpha c_{-H}(1-\cos(c)) + \beta c_{-H}\sin(c)\}\sin(a) - \alpha s_{-H}\sin(a) + \cos(a) \end{bmatrix} =$$

$$\begin{bmatrix} \sin(c)\sin(a) - \Delta KR\cos(c)\sin(a) - \Delta JR\cos(a) \\ -\Delta KR\sin(c)\sin(a) - \cos(c)\sin(a) + \Delta IR\cos(a) \\ \Delta JR\sin(c)\sin(a) + \Delta IR\cos(c)\sin(a) + \cos(a) \end{bmatrix},$$

where an error in a displaced spindle turning centerline $As_{-H}$ with respect to an original spindle turning centerline $Cs_{-H}$ is as follows:

$\delta sx_{-H}$, $\delta sy_{-H}$, $\delta sz_{-H}$ are an X component, a Y component, and a Z component, respectively, of a deviation distance between $As_{-H}$ and $Cs_{-H}$ observed when A=0 and C=0 and corresponding to $Co_{-H}$ that is an intersecting point between an original A axis rotation centerline $Ca_{-H}$ and an original C axis rotation centerline $Cc_{-H}$, $\alpha s_{-H}$, $\beta s_{-H}$, $\gamma s_{-H}$ indicate that, when A=0 and C=0, $As_{-H}$ is tilted from $Cs_{-H}$ with a rotation error $\alpha s_{-H}$ around an X axis, a rotation error $\beta s_{-H}$ around a Y axis, and a rotation error $\gamma s_{-H}$ around a Z axis, respectively, and $n_{S-H}$ is a direction vector of $As_{-H}$, an error in a displaced C axis rotation centerline $Ac_{-H}$ with respect to the original C axis rotation centerline $Cc_{-H}$ is as follows:

$\delta cx_{-H}$, $\delta cy_{-H}$, $\delta cz_{-H}$ are the X component, Y component, and Z component, respectively, of a deviation distance between $Ac_{-H}$ and $Cc_{-H}$ observed when A=0 and corresponding to $Co_{-H}$ that is the intersecting point between the original A axis rotation centerline and the original C axis rotation centerline, $\alpha c_{-H}$, $\beta c_{-H}$, $\gamma c_{-H}$ indicate that, when A=0, $Ac_{-H}$ is tilted from $Cc_{-H}$ with a rotation error $\alpha c_{-H}$ around the X axis, a rotation error $\beta c_{-H}$ around the Y axis, and a rotation error $\gamma c_{-H}$ around the Z axis, respectively, and $n_{C-H}$ is a direction vector of $Ac_{-H}$, an error in a displaced A axis rotation centerline $Aa_{-H}$ with respect to the original A axis rotation centerline $Ca_{-H}$ is as follows:

$\delta ax_{-H}$, $\delta ay_{-H}$, $\delta az_{-H}$ are the X component, Y component, and Z component, respectively, of a deviation distance between $Aa_{-H}$ and $Ca_{-H}$ corresponding to $Co_{-H}$ that is the intersecting point between the original A axis rotation centerline and the original C axis rotation centerline, $\alpha a_{-H}$, $\beta a_{-H}$, $\gamma a_{-H}$ indicate that $Aa_{-H}$ is tilted from $Ca_{-H}$ with a rotation error $\alpha a_{-H}$ around the X axis, a rotation error $\beta a_{-H}$ around the Y axis, and a rotation error $\gamma a_{-H}$ around the Z axis, respectively, and $n_{A-H}$ is a direction vector of $Aa_{-H}$, $Ma_H$ is a matrix that rotates, by a, around the vector $n_{A-H}$ indicative of the direction of $Aa_{-H}$, and $Mc_H$ is a matrix that rotates, by c, around the vector $n_{C-H}$ indicative of the direction of $Ac_{-H}$ when A=0.

\* \* \* \* \*